(12) United States Patent
Kondo et al.

(10) Patent No.: US 7,502,530 B2
(45) Date of Patent: Mar. 10, 2009

(54) OPTICAL WAVEGUIDE DEVICES AND TRAVELING WAVE TYPE OPTICAL MODULATORS

(75) Inventors: Jungo Kondo, Nishikamo-Gun (JP); Atsuo Kondo, Okazaki (JP); Kenji Aoki, Ichinomiya (JP); Osamu Mitomi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 10/568,888

(22) PCT Filed: Aug. 19, 2004

(86) PCT No.: PCT/JP2004/012221

§ 371 (c)(1),
(2), (4) Date: Dec. 22, 2006

(87) PCT Pub. No.: WO2005/019913

PCT Pub. Date: Mar. 3, 2005

(65) Prior Publication Data

US 2007/0147722 A1   Jun. 28, 2007

Related U.S. Application Data

(63) Continuation-in-part of application No. 10/886,457, filed on Jul. 7, 2004, now abandoned.

(30) Foreign Application Priority Data

Aug. 21, 2003   (JP)   .............. 2003-297527

(51) Int. Cl.
G02F 1/035   (2006.01)
(52) U.S. Cl. .............. 385/2; 385/1; 385/14; 385/8; 385/40; 385/129

(58) Field of Classification Search .............. 385/1, 385/2, 3, 14, 39, 40, 31, 129, 130, 131, 132
See application file for complete search history.

(56) References Cited

U.S. PATENT DOCUMENTS 5,408,566 A   4/1995   Eda et al. ............. 385/131

(Continued)

FOREIGN PATENT DOCUMENTS

EP   1 193 536 A2   4/2002   ............. 385/3 X (Continued)

OTHER PUBLICATIONS

Jungo Kondo et al., "*40 Gbit/s Single-Drive Thin Sheet X-cut LiNbO₃ Optical Modulator with Low Driving-Voltage of 2V*," Pro. Optical Fiber Communication '04, FL4, Feb. 23, 2004.

(Continued)

*Primary Examiner*—Brian M Healy
(74) *Attorney, Agent, or Firm*—Burr & Brown

(57) ABSTRACT

A device 4 has a substrate 5, an optical waveguide 2 and modulation electrodes 1A, 1B, 1C. The substrate 5 is made of an electro-optic material and has a thickness of $\leq 30$ μm at least in a region where the modulation electrode applies an electric field. The device has a ridge generated when the optical waveguide is formed, and the ridge has a height H (angstrom) and a width "W" (μm) whose product (H×W) is 7150 angstrom·μm or smaller to realize single mode propagation of light in the optical waveguide. The wave guide has branched parts in the region where the modulation electrode applied an electric field. The deviation of positions of peaks and bottoms in the extinction ratio curve can be reduced, by increasing the distance of the branched parts of the optical waveguide to $\geq 46$ μm.

18 Claims, 21 Drawing Sheets

U.S. PATENT DOCUMENTS

| | | | |
|---|---|---|---|
| 5,526,169 A * | 6/1996 | Kikuchi et al. | 359/245 |
| 5,991,489 A | 11/1999 | Kondo | 385/129 |
| 6,219,469 B1 | 4/2001 | Minakata et al. | 385/2 |
| 6,567,598 B1 | 5/2003 | Burrows | 385/129 |
| 6,760,493 B2 * | 7/2004 | Pruneri et al. | 385/8 |
| 6,819,851 B2 | 11/2004 | Aoki et al. | 385/129 |
| 7,002,731 B2 * | 2/2006 | Mitomi et al. | 359/322 |
| 2001/0004410 A1 | 6/2001 | Kondo et al. | 385/2 |
| 2002/0126932 A1 | 9/2002 | Minakata et al. | 385/2 |
| 2003/0044100 A1 | 3/2003 | Kondo et al. | 385/3 |
| 2007/0147722 A1 * | 6/2007 | Kondo et al. | 385/2 |

FOREIGN PATENT DOCUMENTS

| | | | | |
|---|---|---|---|---|
| EP | 1 245 993 A1 | 10/2002 | | 385/14 X |
| EP | 1 291 706 | 3/2003 | | |
| EP | 1 455 219 A1 | 9/2004 | | 385/3 X |
| JP | 56-164313 A1 | 12/1981 | | 385/3 X |
| JP | 04-163420 | 6/1992 | | |
| JP | 04-371913 | 12/1992 | | |
| JP | 05-088124 | 4/1993 | | 385/3 X |
| JP | 05-264937 A1 | 10/1993 | | 385/3 X |
| JP | 06-281829 A1 | 10/1994 | | 385/3 X |
| JP | 06-289344 | 10/1994 | | 385/131 X |
| JP | 09-211402 A1 | 8/1997 | | 385/3 X |
| JP | 10-133159 A1 | 5/1998 | | 385/3 X |
| JP | 10-239544 A1 | 9/1998 | | 385/3 X |
| JP | 2001-235714 A1 | 8/2001 | | 385/3 X |
| JP | 2002-169133 A1 | 6/2002 | | 385/3 X |
| JP | 2002-357797 A1 | 12/2002 | | 385/3 X |
| JP | 2003-156723 A1 | 5/2003 | | 385/3 X |
| JP | 2003-215519 A1 | 7/2003 | | 385/3 X |
| JP | 2004-341147 A1 | 12/2004 | | 385/3 X |

OTHER PUBLICATIONS

H. Miyazawa et al., "*DC Drift Phenomena of Ti:LiNbO$_3$ Optical Modulator*," The Institute of Electronics, Information and Communication Engineers, 1994, SA-9-3, pp. 293-294.

* cited by examiner

OPTICAL WAVEGUIDE DEVICES AND TRAVELING WAVE TYPE OPTICAL MODULATORS

FIELD OF THE INVENTION

The present invention relates to an optical waveguide device and a traveling wave type optical modulator.

BACKGROUND OF THE INVENTION

An optical modulator, particularly a traveling type optical modulator, using lithium niobate (LiNbO$_3$), lithium tantalate (LiTaO$_3$) or gallium-arsenide (GaAs) for the optical waveguide has excellent properties and may realize a broadband modulation at a high efficiency. Lithium niobate and lithium tantalate are excellent ferroelectric materials having large electro-optic coefficients and can control light within a short optical path. Factors suppressing the modulation speed of the traveling-wave optical modulator include velocity mismatch, dispersion, electrode conductor loss, dielectric loss and mismatch of impedance.

Such type of optical modulator normally includes a substrate, an optical waveguide, modulating electrodes including signal and ground electrodes and a buffer layer, and thus has a relatively complex structure. The dimension of each element has been proposed and variously studied until now.

The assignee filed a Japanese patent publications H10-133,159A (U.S. Pat. No. 6,219,469) and 2002-169133A, disclosing a traveling wave optical modulator with an optical waveguide substrate having a thinner portion with a thickness of not more than 10 μm where the optical waveguide is formed. It is thereby possible to realize high-speed modulation without forming a buffer layer made of silicon dioxide, and to advantageously reduce the product "Vπ·L" of a driving voltage Vπ and a length "L" of an electrode.

Further, so called multi-media industry has been developed and broad band communication has been increasingly demanded, so that it has been already applied an optical communication system operating at a speed higher than 10 Gb/s. Such system operating at even higher speed is expected. An LN optical modulator is applied as a device for modulating electrical signal of 10 Gb/s or higher (microwave signal) to light.

It was invented a structure for attaining velocity matching of microwave and light wave to realize wide-band modulation of an optical modulator, by lowering the thickness of an optical waveguide substrate. Further, in the structure having the thinner optical waveguide substrate, it is necessary to reduce the thickness of the substrate around its optical waveguide to about 10 micrometers for satisfying the velocity matching condition. The assignee further filed Japanese patent publication 2002-169133A disclosing a two-step groove structure at the back face, for preventing the flattening of the optical mode field pattern and to reduce the transmission loss of light generated due to the surface roughness and damage caused by the processing for reducing the thickness of and forming a groove in the substrate. Further, it is possible to form the two-step groove structure in the substrate after the thickness of the substrate is made thinner and uniform in producing the groove structure. In this case, Japanese patent application 2001-101729 was filed disclosing a structure of providing a reinforcing substrate for maintaining the mechanical strength of the whole device.

The device described in Japanese patent publication H9-211402A has a structure capable of satisfying the velocity matching condition by providing an air layer in the reinforcing substrate. Further, a device described in Japanese patent publication 2001-235714A has an optical waveguide formed on the adhesive face to the supporting body.

According to the devices of Japanese patent publications 2002-169133A and 2001-101729A, however, a groove is formed on the back face of a substrate for modulation and the substrate is then joined with the reinforcing substrate with an adhesive layer made of a material of a low dielectric constant. According to this kind of structure, it has been proved that the temperature drift or DC drift may be made considerable when an excessive load is applied thereon in a reliability test such as thermal shock and temperature cycle tests.

SUMMARY OF THE INVENTION

According to optical modulators with thin-sheet structure described in Japanese patent publication Nos. 10-133159A and 2002-169133A, it has been found that the extinction ratio is deteriorated compared with that of a normal type modulator, after extensive study of the curve of measured extinction ratio. For example, as shown in FIG. 11, the extinction ratio, or the peak top of the curve of extinction ratio (power output during on-time) takes different values depending on the applied voltage. The peak top and bottom of the extinction ratio curve are detected as well as the operational point of the bias voltage (normally applied voltage of V(π/2)), the peak top of the light intensity may be deviated depending on the voltage as described above. The detection is thus made impossible. Further, as shown in FIG. 13, the level of ON/OFF, or the characteristic of extinction ratio may be deviated depending on the wavelength, the operation of broad band over wide wavelength range may be prevented for D-WDM (for example for C band or L band). Normally, these characteristics of an LN modulator are considered to be advantageous compared with an EA modulator for the operation of narrow wavelength band. It is proved that such advantages may be cancelled and problematic.

An object of the present invention is to improve the extinction ratio characteristic and output power characteristic during on-time in an optical waveguide device comprising a substrate of an electro-optic material, an optical waveguide and a modulation electrode wherein said substrate has a thickness of 30 μm or smaller in a region where said modulation electrode applies a voltage.

Further, the assignee has reached the idea of joining a supporting body with an adhesive layer of a substantially uniform thickness on the back face of a thin optical waveguide substrate having a thickness of 30 μm or smaller, as described in Japanese patent publication No. 2002-330325A.

However, a DC drift was observed due to stress generated by the difference of thermal expansion of the optical waveguide substrate and supporting body so as to cause hysterisis in the curve of extinction ratio. FIG. 21 shows the extinction ratio curve when the optical waveguide substrate is composed of an LN substrate and the supporting body is composed of quartz glass having a large difference of thermal expansion. Hysterisis shown in FIG. 21 may be observed in optical power obtained by applying sine curve signal of 1 kHz and having a peak voltage of 10 V. FIG. 20 shows the curve without substantial hysterisis.

When an optical modulator is driven, the bias point is generally shifted at an intermediate point (V/(π/2)) of the maximum and minimum values of optical power by means of an auto bias control circuit. When the hysterisis phenomenon is observed as shown in FIG. 21, however, the bias point cannot be shifted to the intermediate point so that the operation of an optical modulator is interrupted.

Further, long-term DC drift is generated to result in a drift of the above bias point so that an auto bias control circuit cannot follow the drift. An object of the present invention is to prevent the hysterisis phenomenon in optical power and long-term DC drift when a signal voltage is applied to an optical waveguide device.

A first aspect of the present invention provides an optical waveguide device comprising a substrate of an electro-optic crystal, an optical waveguide and a modulation electrode, wherein the substrate of an electro-optic material has a thickness of 30 µm or smaller at least in a region where the modulation electrode applies an electric field. The source is remained and swelled on the substrate when the optical waveguide is formed, and the ridge has a height H (angstrom) and a width "W" (µm) whose product (H×W) is 7150 angstrom·µm or smaller.

Further, a first aspect of the present invention provides an optical waveguide device comprising a substrate of an electro-optic crystal, an optical waveguide and a modulation electrode. The substrate of an electro-optic material has a thickness of 30 µm or smaller at least in a region where the modulation electrode applies an electric field. At least the horizontal optical field pattern of the optical waveguide around the end face is single mode at least.

The inventors have studied the cause of the deviation of extinction ratio depending on the wavelength described above in detail and found the followings. That is, when the thickness of the substrate is as small as, for example, 30 µm or smaller, and further 15 µm or smaller, light propagates in the optical waveguide in multi mode. In particular, the spot size of the high-order mode guided light wave tends to be smaller in horizontal direction (a direction parallel with the surface of an LN substrate). It has been found that this may be the cause of the deviation of extinction ratio depending on the wavelength and the deviation of the operational point of the applied voltage.

Based of the above findings, the present inventors tried to make light propagating in single mode at least around the outlet part of an optical waveguide at least in horizontal direction, when the thickness of the substrate of an electro-optic single crystal is 30 µm or smaller. It is thus found that the deviation of the operational point of the applied voltage and extinction ratio depending on wavelength can be prevented. The "the outlet part" means an optical waveguide elongating straightforwardly after light propagating in Y-shaped branched optical waveguide is optically coupled.

Until now, it has not been known that it may occur the deviation of the operational point of the applied voltage and extinction ratio depending on wavelength when the thickness of the optical waveguide substrate is 30 µm or smaller and that the cause is multi mode propagation of light in the optical waveguide and particularly a reduction of spot size of guided light in horizontal direction.

The present invention is realized only after the discovery of the above problems and the cause, and provides great use value in the industry.

Further, the inventors have studied the conditions of producing an optical waveguide for making light propagating in single mode in at least horizontal direction of an optical waveguide. It was found that the diffused region forms a swell during the production of an optical waveguide and the shape of the swell and the mode condition of the optical waveguide are correlated with each other. Specifically, the shapes of the optical waveguide and the swells were tested by means of a laser microscope. As a result, it was found that the conditions for single mode propagation of the optical waveguide at least in the horizontal direction is as follows.

(A product (H×W) of the height "H" (angstrom) of a swell formed during the formation of an optical waveguide and the width "W" (µm) of the swell≦7150 angstrom·µm)

It is thus successfully improved the extinction ratio characteristic. On the viewpoint, H×W may preferably be 6900 angstrom·µm or smaller, and more preferably be 6000 angstrom·µm or smaller.

When H·W becomes too small, the mode diameter becomes large so that the coupling loss with an outer optical fiber becomes larger. On the viewpoint of reducing the coupling loss, H×W may preferably be 3000 angstrom·µm or larger, and more preferably be 3400 angstrom·µm or larger.

According to a preferred embodiment, H≦1100 angstrom and W≦6.5 µm are satisfied. It is thus possible to reduce the dependency of the positions of peak and bottom of the extinction ratio curve on voltage.

The inventors have further reached the following discovery. That is, when light is propagated in an optical waveguide in single mode at least in horizontal direction, the mode size is widened so that the mode coupling of the optical waveguides in the waveguide part (interacting part with an electrode) of a Mach-Zehnder interferometer is increased. As a result, the branching ratio may be shifted to deteriorate the extinction ratio. The dependency of the extinction ratio on wavelength becomes large.

On the contrary, it is possible to improve the extinction ratio to a value of 20 dB or more by elevating a distance between branched optical waveguides to 46 µm or more. It is thus found that the dependency of the extinction ratio on wavelength can be also reduced.

A second aspect of the present invention provides an optical waveguide device comprising an optical waveguide substrate, a supporting body for supporting the optical waveguide substrate and an adhesive layer for adhering the optical waveguide substrate and the supporting body. The optical waveguide substrate comprises a plate-shaped main body comprising an electro-optic material, first and second main faces opposing each other and a thickness of 30 µm or smaller, an optical waveguide provided on the main body and an electrode provided on the main body. The adhesive layer adheres the supporting body and the second main face of the main body. The minimum value of the thermal expansion coefficient of the supporting body is ⅕ or larger of the minimum value of the thermal expansion coefficient of the main body, and the maximum value of the thermal expansion coefficient of the supporting body is 5 times or smaller of the maximum value of the thermal expansion coefficient of the main body.

According to the present invention, a plate-shaped main body having a thickness of 30 µm or smaller, and a supporting body and main body are adhered with an adhesive layer. It is thus possible to prevent the position of stress concentration in an optical waveguide substrate to disperse the stress and to reduce the maximum stress applied on the optical waveguide substrate. Further, grinding process can be applied for processing the substrate to produce a thin plate, so that processing damage can be considerably prevented by means of an appropriate method and the deterioration of the fracture strength can be prevented at the same time.

Simultaneously, the minimum of the thermal expansion coefficient of the supporting body is made ⅕ or larger of the minimum value of the thermal expansion coefficient of the optical waveguide substrate, and the maximum value of the thermal expansion coefficient of the supporting body is made 5 times or smaller of the thermal expansion coefficient of the optical waveguide substrate. It is thus possible to prevent the hysterisis phenomenon of optical power when a signal voltage is applied and the long-term DC drift can be reduced.

The reason for such advantageous effects is not clear. However, "The Institute of Electronics, Information and Communication Engineers 1994 S A-9-3" by Miyazawa, Mitomi et. al. in NTT describes the correlation between the stress and DC drift. According to the inventive structure, it may be thus speculated that the DC drift is generated due to internal stress caused by the difference of thermal expansion coefficients of the main body and optical waveguide substrate.

BEST MODES FOR CARRYING OUT THE INVENTION

Figure 1:
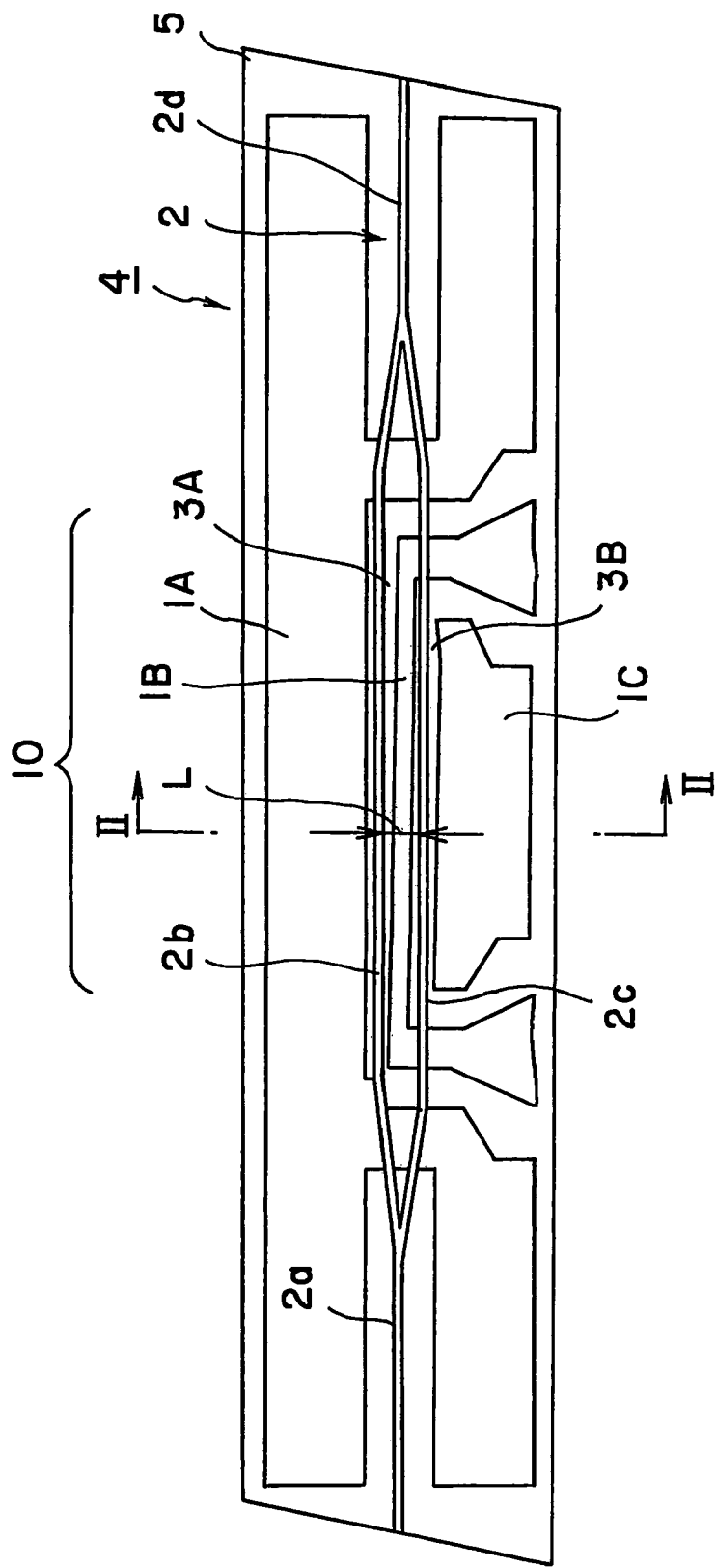
FIG. 1 is a plan view showing a device 4 according to an embodiment of the present invention.
Figure 2:
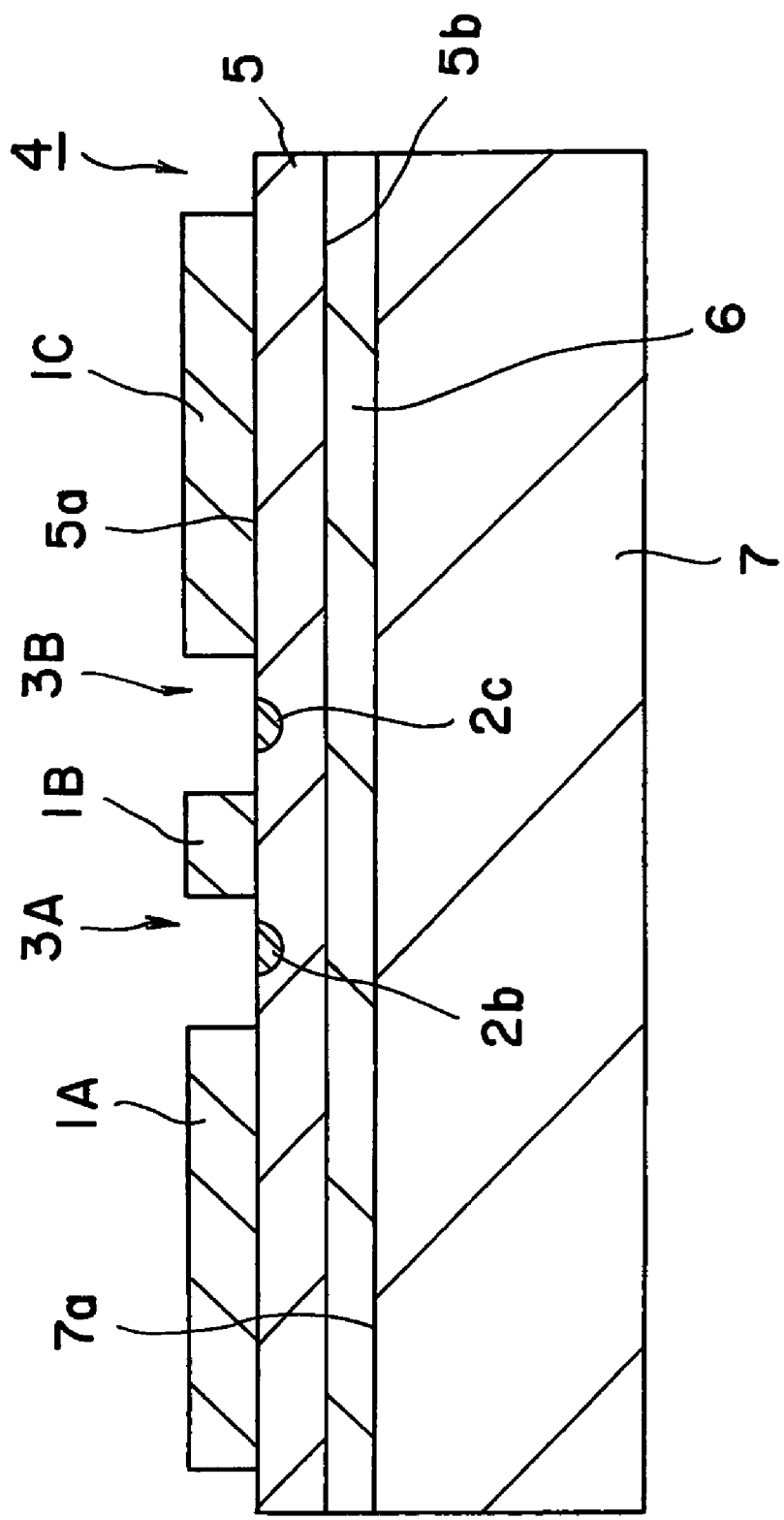
FIG. 2 is a cross sectional view schematically showing a device 4.

The present invention will be described further in detail referring to the attached drawings. FIGS. 1 and 2 are schematic views showing a device 4 according to an embodiment of a first aspect of the present invention.

The main body 5 has a shape of a flat plate. Ground electrodes 1A, 1C and a signal electrode 1B are formed on a first main face 5a of a substrate 5. According to the present example, electrode configuration of so called Coplanar waveguide (CPW electrode) is applied. An optical waveguide 2 has an inlet part 2a, an outlet part 2d and a pair of branched parts 2b and 2c. In a region 10 for applying an electric field, a pair of branched parts 2b and 2c of an optical waveguide are positioned between adjacent electrodes, so that a signal voltage can be applied on the optical waveguides 2b and 2c substantially in a horizontal direction. The optical waveguide 2 constitutes an optical waveguide of so-called Mach-Zehnder type. The distance L between the branched parts 2b and 2c is preferably 46 μm or longer.

Figure 3:
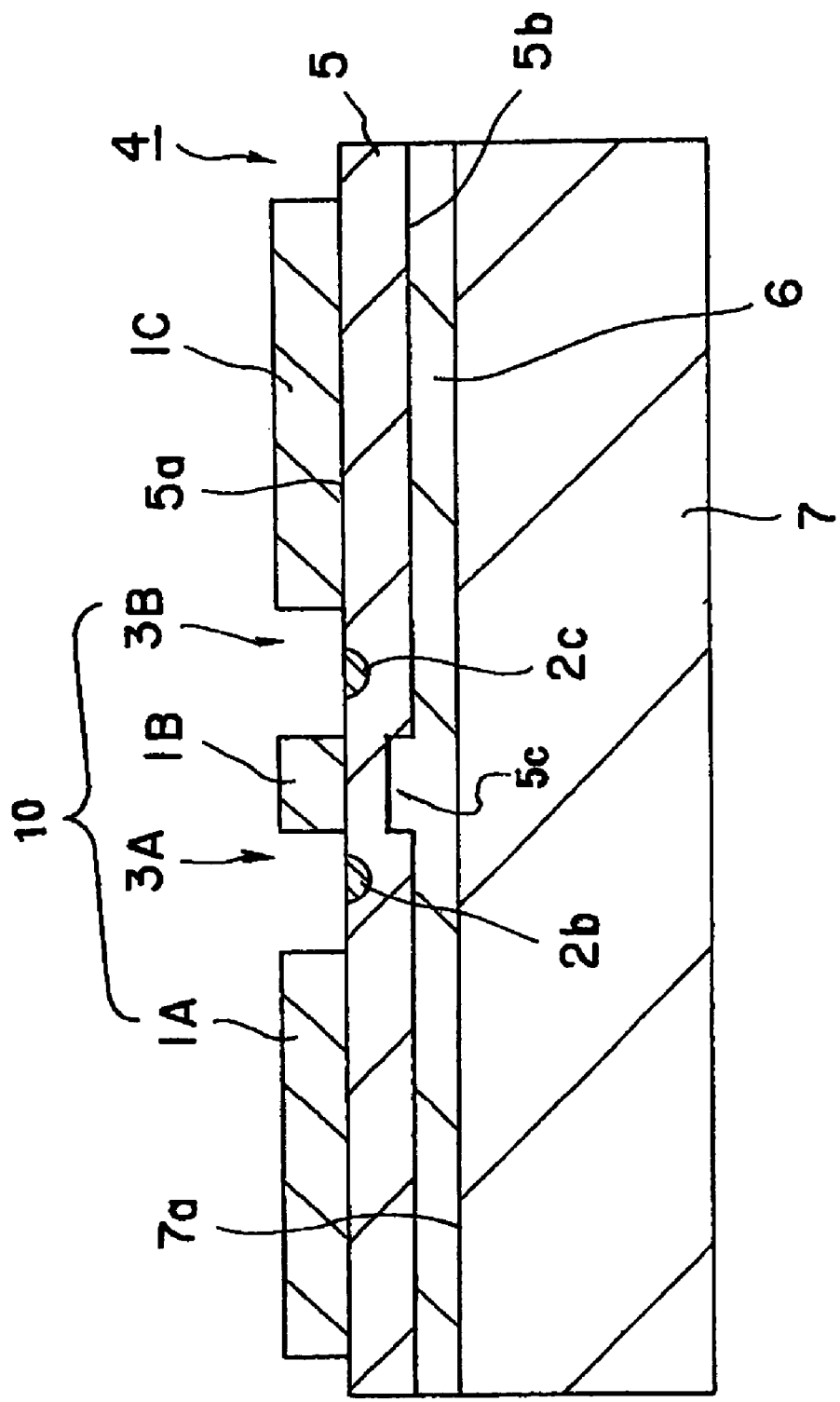
FIG. 3 is a cross sectional view showing a device where a groove 5c is provided in a substrate between branched parts.

The inventors have further reached the following discovery. The mode coupling of the optical wave guides is problematic in waveguide part of a Mach-Zehnder interferometer (interaction part with an electrode). As to the problem, it is found that the mode coupling between the optical waveguide parts can be reduced by forming a groove 5c between the branched optical waveguide parts as shown in FIG. 3. As a result, the extinction ratio can be made 20 dB or more and the dependency of the extinction ratio on wavelength can be reduced, when the optical waveguide is made single mode propagation mode at least in a horizontal direction.

Figure 4:
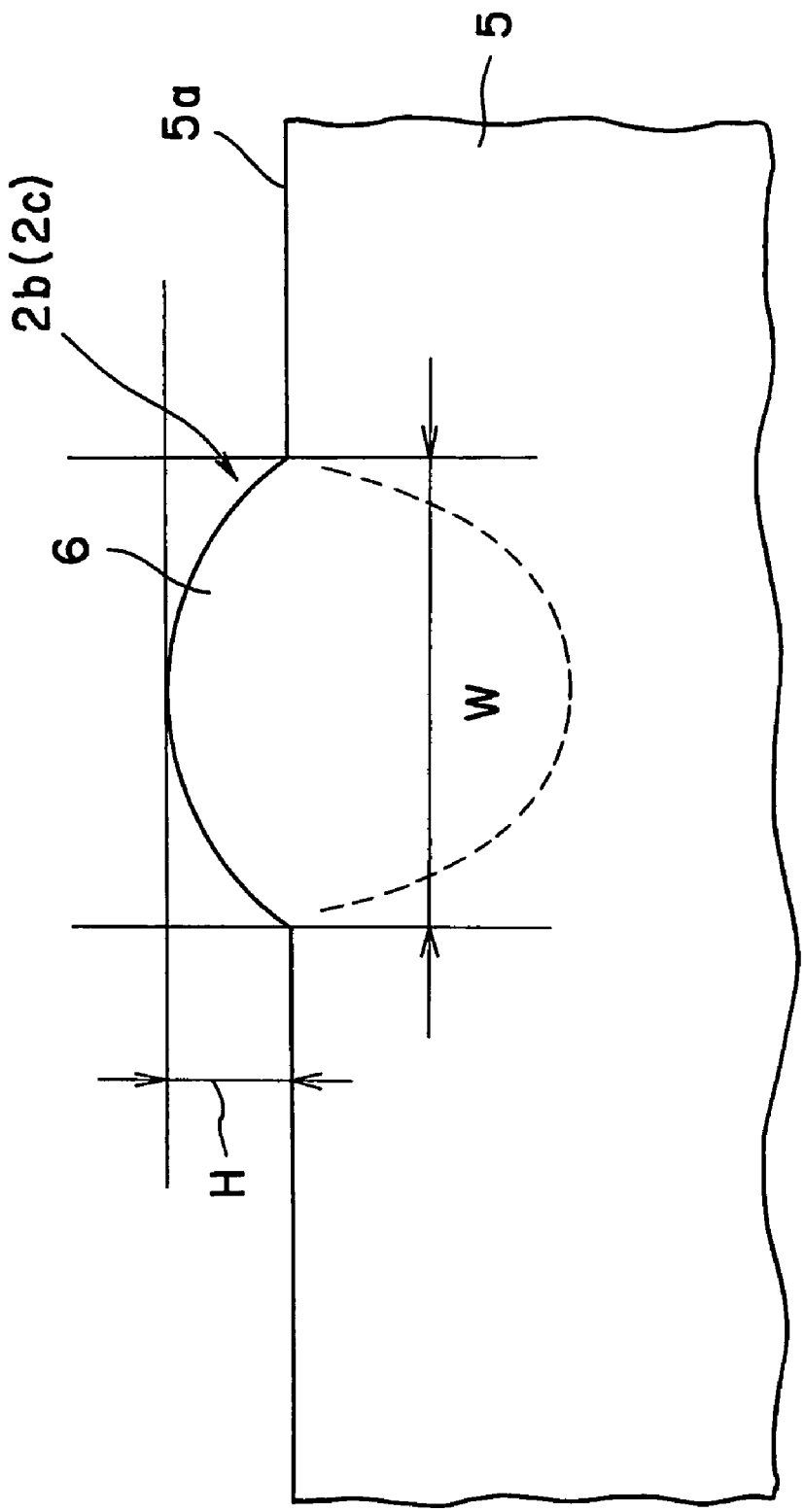
FIG. 4 is an enlarged view showing optical waveguides 2b and 2c.
Figure 5:
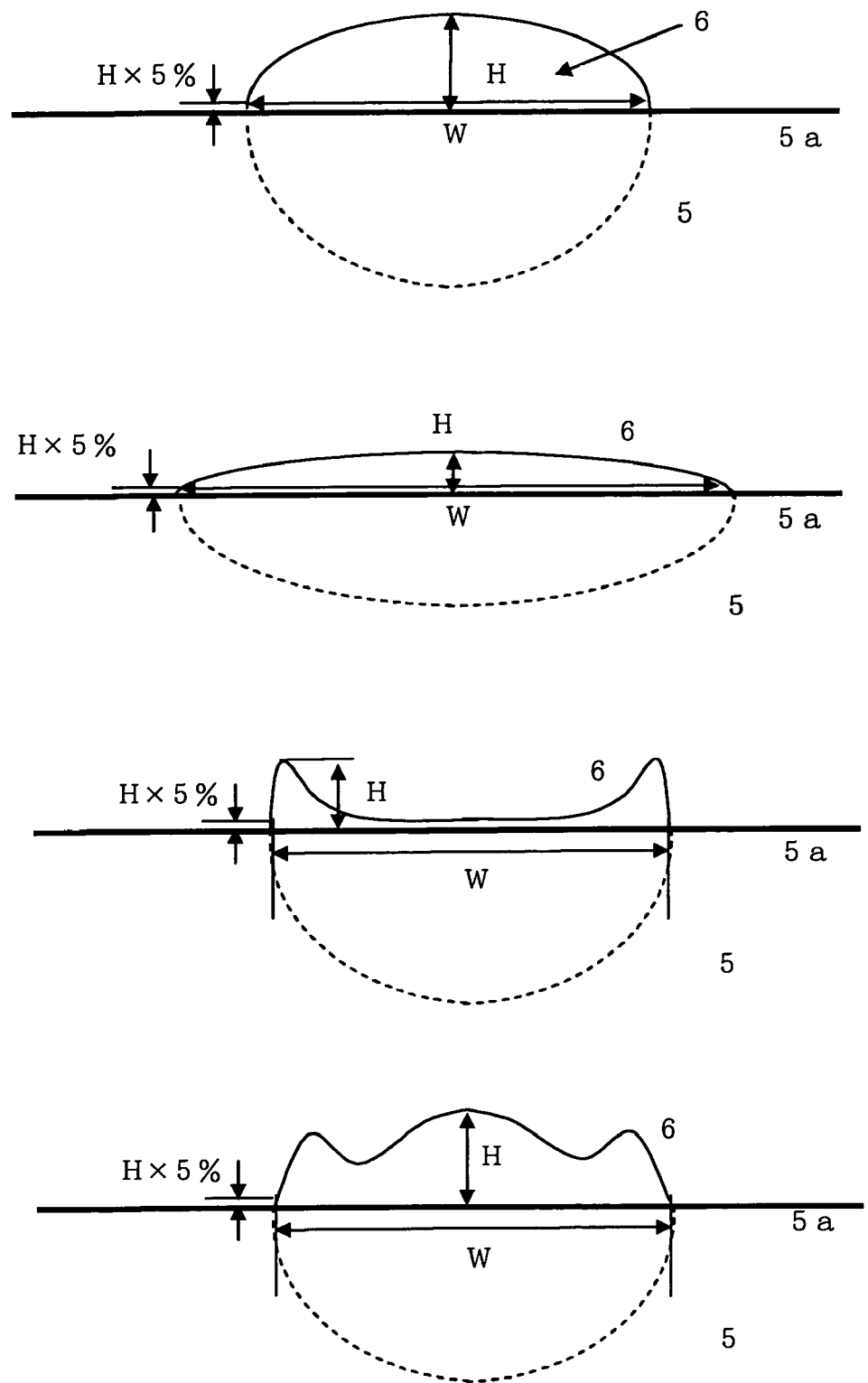
FIG. 5 is a schematic view showing the relationship of the height H and width W of each of various shapes of ridges.

FIG. 4 is an enlarged cross sectional view showing the optical waveguide parts 2b and 2c. When the optical waveguide parts 2b and 2c are formed, an appropriate diffusing agent such as titanium is mounted on a main face 5a, which is then subjected to a heat treatment. During the process, a ridge 6 is formed on the main face 5a due to the diffusion. Although the shape and pattern of the ridge are variously changed as shown in FIG. 5, the height H of the ridge is defined as a peak height value of the swell and the width W is defined as a distance between two most distant points selected from all the points whose heights are 5 percent of the height H. Based on the definitions, the product of the width W and height H of the ridge 6 is made 7150 angstrom·μm according to the present invention.

A buffer layer may be provided between the main body and electrodes. Further, the present invention may be applied in the case where the electrode configuration is of asymmetrical coplanar strip line type.

The main body is made of a ferroelectric electro-optic material and may preferably of a single crystal. Although such crystal is not particularly limited as far as the modulation of light is possible, the crystal includes lithium niobate, lithium tantalate, a solid solution of lithium niobate-lithium tantalate, potassium lithium niobate, KTP and quartz.

The materials of the ground and signal electrodes are not particularly limited as far as the material is excellent in impedance characteristic, and may be composed of gold, silver, copper or the like.

The buffer layer may be made of known materials such as silicon oxide, magnesium fluoride, silicon nitride and alumina.

The optical waveguide is formed in a main body by inner diffusion or ion exchange process, and may preferably be titanium diffusion optical waveguide or proton exchange optical waveguide, and most preferably be titanium diffusion optical waveguide. The electrode is formed on the first main face of the main body. The electrode may be directly formed on the first main face or may be formed on the buffer layer.

The following ranges are most preferred conditions for producing an optical waveguide.

Thickness of Ti: 450 to 1000 angstrom
Temperature for diffusion: 950 to 1100° C.
Time for diffusion: 4 to 11 hours
Width of mask pattern of waveguide: 3 to 7 μm In the main body, the polarization axis of the crystal may preferably be substantially parallel with the first main face 5a of the substrate. In this case, it is preferred an X-plate or Y-plate of lithium niobate single crystal, lithium tantalate single crystal, or single crystal of solid solution of lithium niobate-lithium tantalate. FIGS. 1 to 5 show examples where the present invention is applied to an X-plate or Y-plate.

Further, according to another embodiment of the present invention, the polarization axis of the crystal is substantially perpendicular to the first main face 5a of the substrate. In this case, it is preferred a Z-plate of lithium niobate single crystal, lithium tantalate single crystal, or single crystal of solid solution of lithium niobate-lithium tantalate. When the Z-plate is used, the optical waveguide is needed to be positioned direct under the electrode. It is preferred to further provide a buffer layer between the surface of the substrate and electrode for reducing the propagation loss of light.

According to the present invention, as shown in FIG. 2, the main body 5 can be joined with a separate supporting body 7. On the viewpoint of minimizing the influence of the supporting body 7 on the propagation velocity of microwave, the material of the supporting body 7 may be a material having a dielectric constant lower than that of the electro-optic material. Such material includes a glass such as quartz glass.

The method of joining the optical waveguide substrate 5 and supporting body 7 is not particularly limited. According to a preferred embodiment, both are adhered. In this case, the refractive index of the adhesive agent may preferably be lower than that of the electro-optic material forming the main body 5.

Specific examples of the adhesive agent include an epoxy resin type adhesive, a thermal setting resin type adhesive and an ultraviolet curable resin type adhesive. Such adhesive may preferably have a thermal expansion coefficient relatively close to that of a material having electro-optic effects such as lithium niobate.

Preferred embodiments of the second aspect of the invention will be described further in detail referring to drawings.

Figure 6:
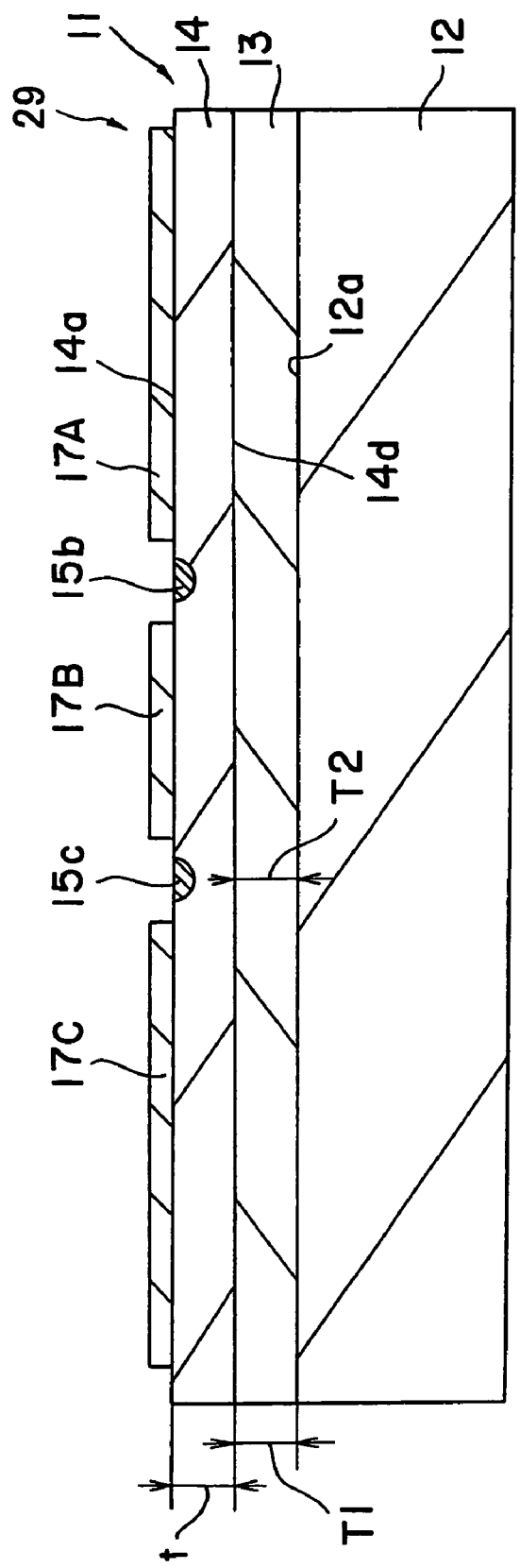
FIG. 6 is a cross sectional view schematically showing a device 11 according to an embodiment of the present invention.

FIG. 6 is a cross sectional view schematically showing an optical modulator 11 according mainly to the first invention. FIG. 6 shows the cross section substantially perpendicular to the direction of the propagation of light in a traveling wave type optical modulator.

An optical modulator 11 has an optical waveguide substrate 29 and a supporting body 12. Each of the main body 14 and substrate 12 has a shape of a flat plate. The thickness of the main body 14 is 30 μm or smaller. Predetermined electrodes 17A, 17B and 17C are formed on a first main face 14a of a main body 14. According to the present example, although so called coplanar type electrode (CPW electrode) configuration is applied, the position and shape of the electrodes are not particularly limited. For example, ACPS type (Asymmetric coplanar strip-line type) may be applied. According to the present example, a pair of optical waveguides 15b and 15c are formed between adjacent electrodes, so that a signal voltage can be applied onto the optical waveguide parts 15b and 15, respectively, substantially in a horizontal direction. The optical waveguide constitutes so called Mach-Zehnder type optical waveguide in a plan view, and the planar pattern is well known (described later). An adhesive layer 13 having a uniform thickness is interposed between the second main face 14d of the main body 14 and the adhesive face 12a of the supporting body 12, so that the main body 14 and supporting body 12 are joined with each other.

According to the optical waveguide device 11, a flat-plate shaped main body having a thickness of 30 μm or smaller is used and adhered with a supporting body with an adhesive, and the adhesion face 12a of the supporting body is made substantially flat. The thickness of the adhesive layer 13 is thus made substantially constant so that the position of stress concentration can be prevented in an optical waveguide device 29. The stress is thus dispersed to reduce the maximum stress in the optical waveguide substrate 29. Further, flat grinding can be used for processing the main body 4 to a thickness of 30 μm or smaller, so that processing damage can be considerably reduced by an appropriate means and the deterioration of the fracture strength can be prevented at the same time.

According to the present invention, a main body 14 is composed of a flat plate having a thickness of 30 μm. The flat plate herein described means a flat plate wherein a recess or groove is not formed on the main faces 14d. That is, the second face 14d (adhesion face) is substantially flat. Although the main face 14d is substantially flat, a surface roughness remaining on the surface due to the processing is permitted, and curvature and warping due to the processing are also permitted.

According to the present invention, optical waveguides 15b and 15c are provided on the side of the first main face 14a of the main body 14. The optical waveguide may be a ridge type optical waveguide directly formed on the first main face of the main body, or a ridge type optical waveguide formed on another layer on the first main face of the main body, or an optical waveguide formed by inner diffusion or ion exchange process in the inside of the main body, such as titanium diffusion or proton exchange waveguide. Specifically, the optical waveguide may be a ridge type optical waveguide protruding from the main face 14a. The ridge type optical waveguide may be formed by laser or mechanical processing. Alternatively, a film of a high refractive index may be formed on the main body 14 and then processed by mechanical or laser ablation processing to produce a ridge type three-dimensional optical waveguide. The film of a high refractive index may be formed, for example, by chemical vapor deposition, physical vapor deposition, organic metal chemical vapor deposition, sputtering or liquid phase epitaxy process.

The main body forming the optical waveguide substrate is composed of a ferroelectric electro-optic material and preferably of a single crystal. Although such crystal is not particularly limited as far as the modulation of light is possible, the crystal includes lithium niobate, lithium tantalate, a solid solution of lithium niobate-lithium tantalate, potassium lithium niobate, KTP and quartz. Lithium niobate, lithium tantalate and a solid solution of lithium niobate-lithium tantalate are most preferred.

In the main body, the polarization axis of the crystal may preferably be substantially parallel with the first main face (surface) of the substrate. In this case, it is preferred an X-plate or Y-plate of lithium niobate single crystal, lithium tantalate single crystal, single crystal of solid solution of lithium niobate-lithium tantalate. FIGS. 6 to 10 show examples where the present invention is applied to an X-plate or Y-plate.

Further, according to another preferred embodiment, the polarization axis of the crystal may preferably be substantially perpendicular to the first main face (surface) of the substrate. In this case, it is preferred a Z-plate of lithium niobate single crystal, lithium tantalate single crystal, single crystal of solid solution of lithium niobate-lithium tantalate. When a Z-plate is used, the optical waveguide is needed to be positioned direct under the electrode. It is preferred to further provide a buffer layer between the surface of the substrate and electrode for reducing the propagation loss of light.

According to the present invention, the minimum value of the thermal expansion coefficient of the supporting body is 1/5 or larger of the minimum value of the thermal expansion coefficient of the main body, and the maximum value of the thermal expansion coefficient of the supporting body is 5 times or smaller of the maximum value of the thermal expansion coefficient of the optical waveguide substrate.

When each of the electro-optic materials forming the main and supporting bodies has no anisotropy in thermal expansion coefficient, the minimum and maximum values of the thermal expansion coefficient are the same in each of the main and supporting bodies. When each of the electro-optic materials forming the main and supporting bodies is anisotropic in thermal expansion coefficient, the thermal expansion coefficient may be changed for the respective axes. For example, when the electro-optic material forming the main body is lithium niobate, the thermal expansion coefficients for X axis and Y axis are $16 \times 10^{-6}/°$ C., respectively, which is the maximum value. The thermal expansion coefficient in Z axis is $5 \times 10^{-6}/°$ C., which is the minimum value. Therefore, the minimum value of the thermal expansion coefficient of the supporting body is made $1 \times 10^{-6}/°$ C. or larger, and the maximum value of the thermal expansion coefficient of the supporting body is made $80 \times 10^{-6}/°$ C. or smaller. For example, the thermal expansion coefficient of quartz glass is $0.5 \times 10^{-6}/°$ C. and thus smaller than $1 \times 10^{-6}/°$ C., for example.

On the viewpoint of the advantageous effects of the present invention, the minimum value of thermal expansion coefficient of the supporting body may more preferably be 1/2 or larger of that of the main body. Further, the maximum value of thermal expansion coefficient of the supporting body may more preferably be 2 times or smaller of the maximum value of that of the main body of the optical waveguide substrate.

Specific examples of the material of the supporting body is not particularly limited, as far as the above conditions are satisfied. When lithium niobate single crystal is used for the main body, the material of the supporting body includes lithium niobate, lithium tantalate, a solid solution of lithium niobate-lithium tantalate and potassium lithium niobate. In this case, lithium niobate same as the material of the main body is most preferred on the viewpoint of a difference of thermal expansion.

The electrodes are provided on the first main face of the main body. The electrodes may be provided directly on the first main face of the main body, or provided on a low dielectric constant layer or a buffer layer. The low dielectric layer may be made of a known material such as silicon oxide, magnesium fluoride, silicon nitride or alumina. The term "low dielectric layer" means a layer composed of a material having a dielectric constant lower than that of the material forming the main body. The dielectric constant of the material may be preferably lower on the viewpoint of satisfying the velocity matching condition of light and micro wave. When the low dielectric layer is not present, the thickness of the main body may preferably be 20 μm or smaller.

According to a preferred embodiment, the face 12a for adhesion of the supporting body 12 is substantially flat. The phrase "the face 12a for adhesion is substantially flat" means that surface roughness remaining after the processing and curvature and warping due to the processing are allowed.

On the viewpoint of the present invention, the thickness T1 of the adhesive layer 13 may preferably be 1000 μm or smaller, more preferably be 300 μm or smaller and most preferably be 100 μm or smaller. Further, the lower limit of the thickness T1 of the adhesive layer 13 is not particularly limited, and may be 10 μm or more on the viewpoint of reducing the effective refractive index of microwave.

Further, on the viewpoint of velocity matching, it is required that the dielectric constant of the adhesive layer is lower than that of the electro-optic material forming the main body, and the dielectric constant may preferably be 5 or lower.

Figure 7:
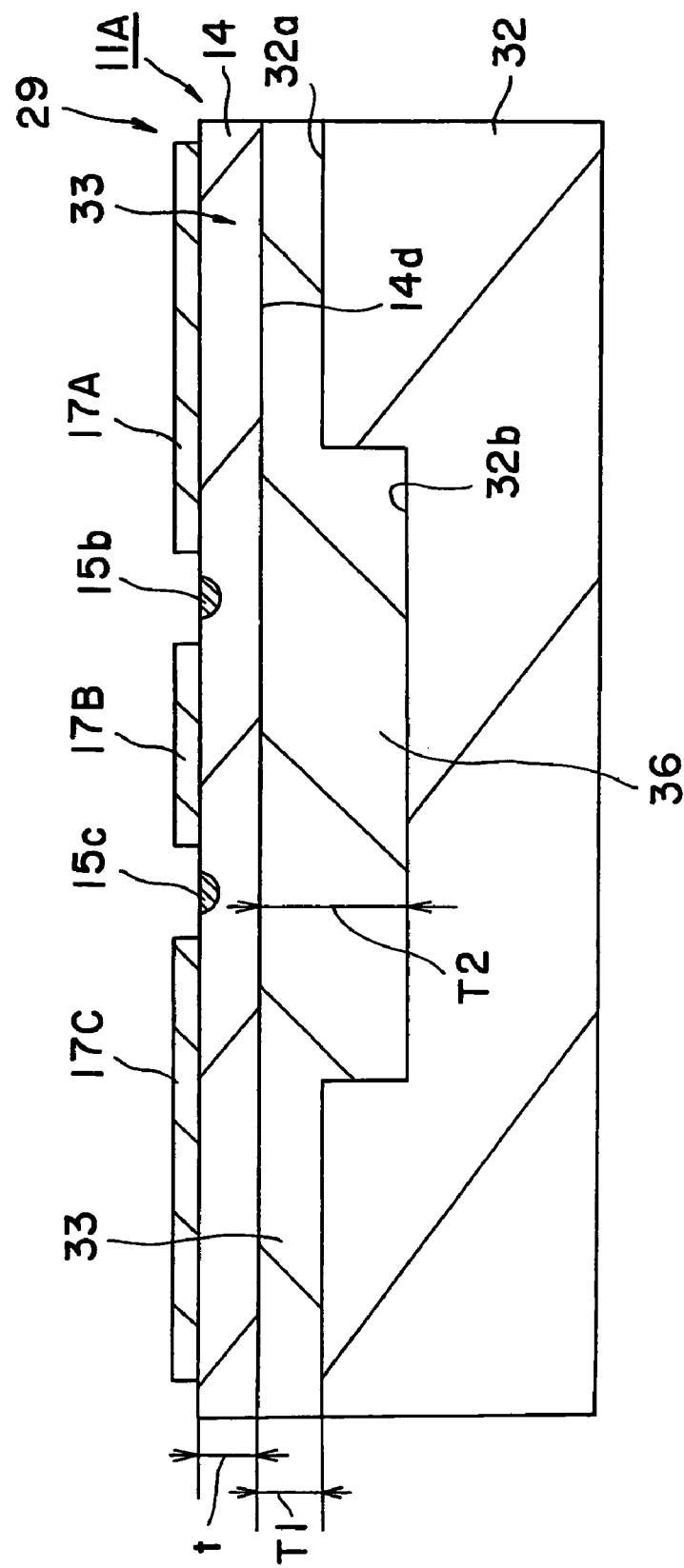
FIG. 7 is a cross sectional view schematically showing a device 11A according to another embodiment of the present invention.

FIG. 7 is a cross sectional view schematically showing an optical waveguide device 11A according to another embodiment of the present invention. FIG. 7 shows a cross section substantially perpendicular to the direction of propagation of light in a traveling type waveguide device.

An optical modulator 11A has an optical waveguide device 29 and a supporting body 32. The main body 14 has a shape of a flat plate, and the thickness of the main body 14 is 30 μm or smaller. The constitution of the optical waveguide device 29 is same as that of the optical waveguide device 29 shown in FIG. 6. A recess or groove 32b is formed on the side of the face 32 for adhesion of the main body 32 at least in the interacting part with an electrode. The groove 32b is elongated in the direction of light propagation (the direction perpendicular to the paper face).

According to the present example, an adhesive layer 33 is interposed between the second main face 14d of the main body 14 and the face 32a for adhesion of the supporting body 32 to adhere the main body 14 and supporting body 32. At the same time, a groove 32b is formed under the main face 14d in regions where optical waveguides 15b and 15c are formed. An adhesive is filled in the groove 32b to form a low dielectric portion 36.

According to the optical waveguide device 11A, the flat-plate shaped main body 14 having a thickness of 30 μm or smaller is used, and the supporting body 32 and main body 14 are adhered with the adhesive layer 33. The thickness T1 of the adhesive layer 33 is made 200 μm or smaller. It is thus possible to facilitating the dispersion of stress in the optical waveguide substrate 29 to reduce the maximum stress applied on the optical waveguide device 29.

According to the present embodiment, however, the thickness T2 of the low dielectric portion 36 made of an adhesive agent is made larger than that of the thickness T1 of the adhesive layer 33, so that a step having a height of (T2-T1) is formed in the thickness of the adhesive layer. Different from the device whose adhesive layer has a constant thickness over the whole length, the concentration of stress may be easily caused in the main body 14 around the step. The thickness T1 of the adhesive layer 33 may preferably be 200 μm or smaller, for reducing the DC and temperature drifts due to such concentration of stress. On the viewpoint, it is required that the thickness T1 of the adhesive layer 33 is 200 μm or smaller, the thickness may preferably be 150 μm or smaller, and more preferably be 110 μm or smaller. The thickness T1 of the adhesive layer 33 is not particularly limited, the thickness may preferably be 0.1 μm or more on the viewpoint of reducing the stress applied on the main body 14.

According to the present invention, the adhesive layer may adhere the second main face and supporting body in a region where an optical waveguide is formed. For example, the optical waveguide devices 11 of FIG. 6 and 11A of FIG. 7 relate to this embodiment. In this case, as shown in FIG. 6, the thickness of the adhesive layer may preferably be substantially constant. The phrase "the thickness of the adhesive layer is substantially constant" means that an error due to production process is to be allowed.

Further, according to the present invention, it is preferred to provide a low dielectric portion having a dielectric constant lower than that of the electro-optic material forming the main body between the second main face and supporting body in a region where optical waveguide is formed. It is thus possible to facilitate the velocity matching as described above.

The kind of the low dielectric portion is not particularly limited. According to a preferred embodiment, the low dielectric portion is an air layer. Further in another preferred embodiment, the low dielectric part is composed of an adhesive (examples of FIGS. 6 and 7). In this case, it is needed to use an adhesive having a dielectric constant lower than that of the electro-optic material.

Further, according to another embodiment of the present invention, the low dielectric portion is composed of a low dielectric material having a dielectric constant lower than that of the electro-optic material, and the low dielectric material does not belong to an adhesive.

Figure 8:
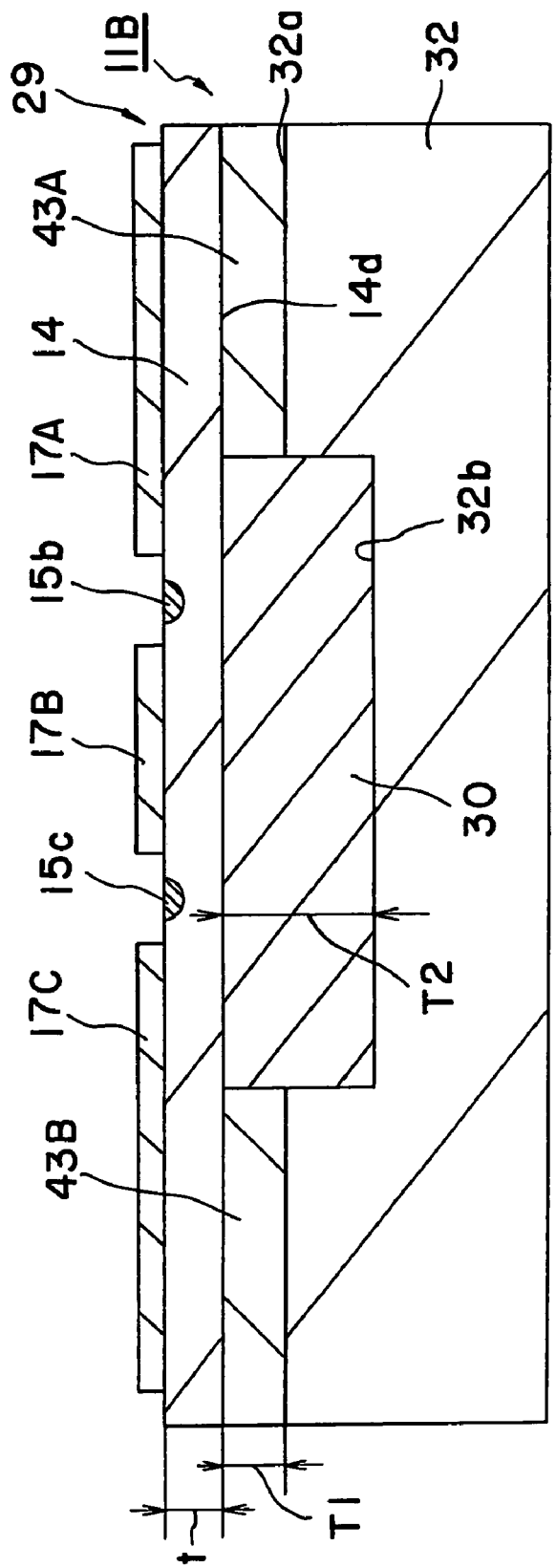
FIG. 8 is a cross sectional view schematically showing a device 11B according to still another embodiment of the present invention.

FIG. 8 is a cross sectional view schematically showing an optical waveguide device 11B. The optical modulator 11B has an optical waveguide substrate 29 and a supporting body 32. The main body 14 has a shape of a flat plate and a thickness of 30 μm of smaller. A recess or groove 32b is formed on the side of the face 32a for adhesion of the main body 32 as that shown in FIG. 7. The groove 32b is elongated in the direction of light propagation (direction perpendicular to the paper face).

According to the present example, adhesive layers 43A and 43B are provided between the second main face 14d of the main body 14 and the adhesion face 32a of the supporting body 32 to adhere the main body 14 and supporting body 32. The groove 32b is formed to provide a low dielectric portion 30 under the main face 14d in regions where optical waveguides 15b and 15c are formed. The low dielectric portion 30 according to the present example is composed of a low dielectric material different from adhesives 43A and 43B.

Figure 9:
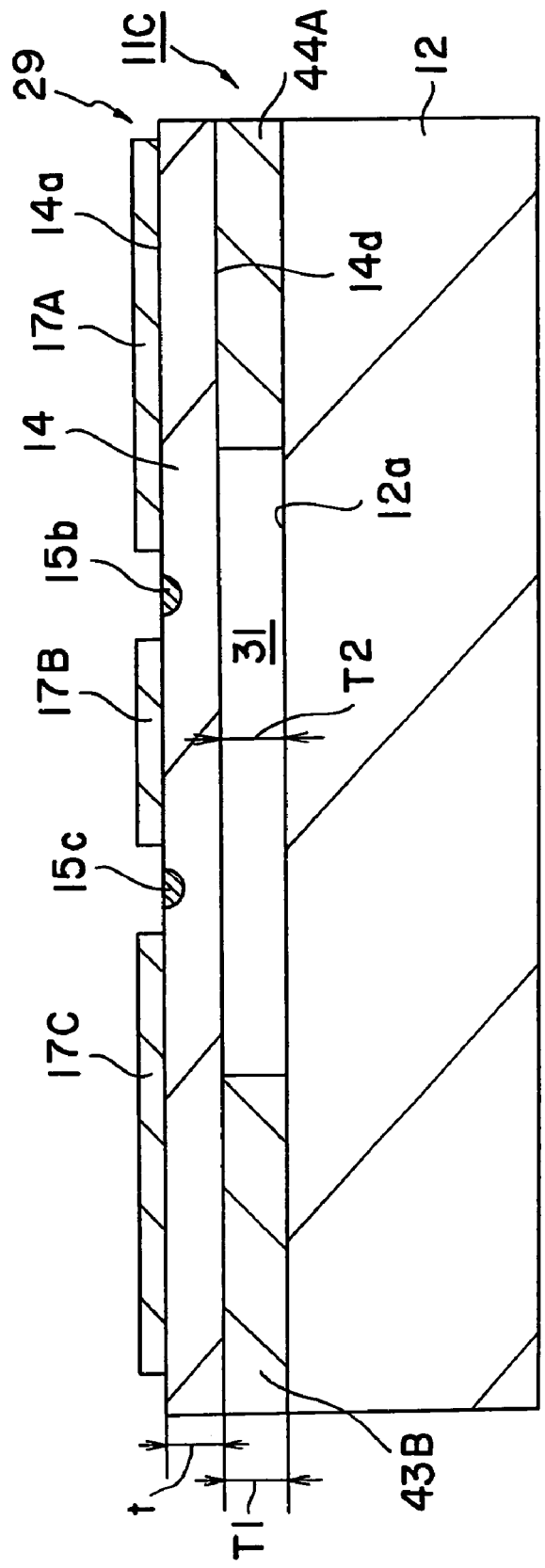
FIG. 9 is a cross sectional view schematically showing a device 11C according to still another embodiment of the present invention.

FIG. 9 is a cross sectional view schematically showing an optical waveguide device 11C. The optical modulator 11C has an optical waveguide substrate 29 and a supporting body 32. The main body 14 has a shape of a flat plate and a thickness of 30 μm of smaller. The adhesion face 12a of the supporting body 12 is substantially flat.

According to the present example, adhesive layers 43A and 43B are provided between the second main face 14d of the main body 14 and the adhesion face 12a of the supporting body 12 to adhere the main body 14 and supporting body 12. An air layer 31 is formed under the main face 14d in regions where optical waveguides 15b and 15c are formed. The air layer 31 functions as a low dielectric portion.

Figure 10:
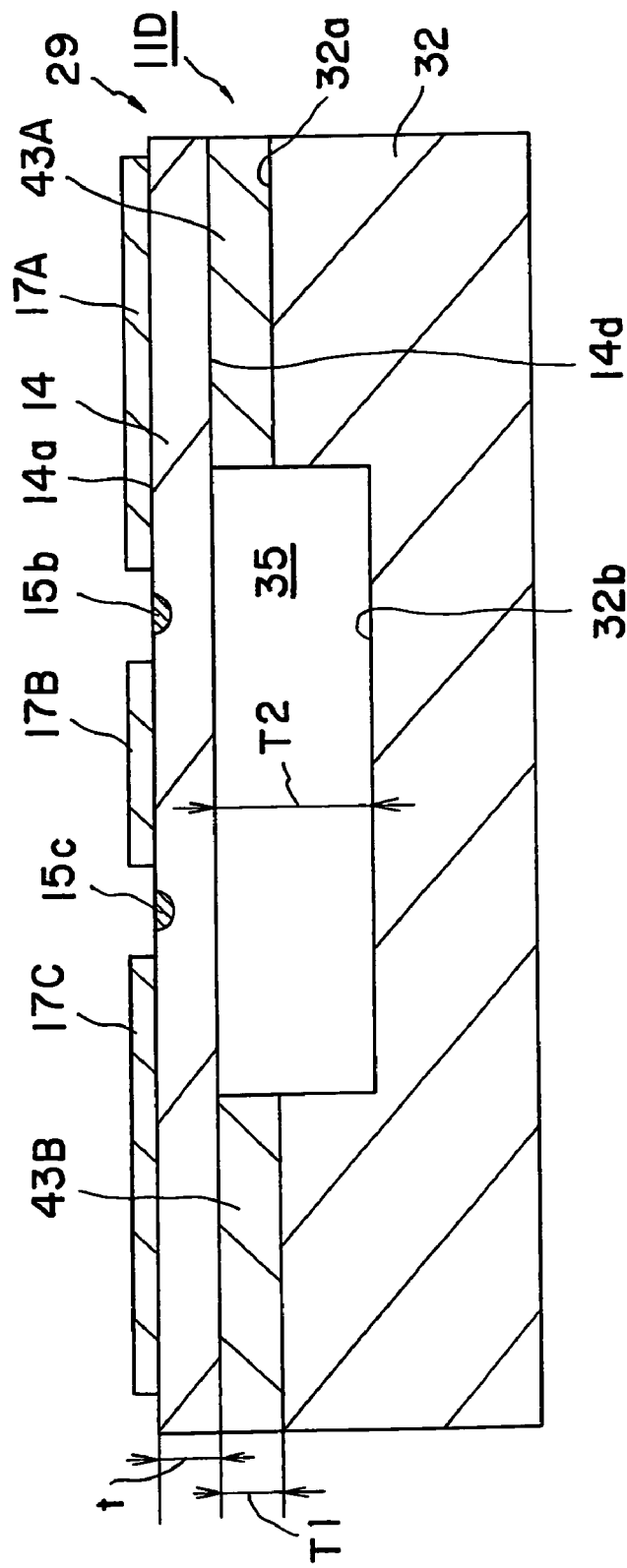
FIG. 10 is a cross sectional view schematically showing a device 11D according to still another embodiment of the present invention.

FIG. 10 is a cross sectional view schematically showing an optical waveguide device 11D. The optical modulator 11D has an optical waveguide substrate 29 and a supporting body 32. The main body 14 has a shape of a flat plate and a thickness of 30 μm of smaller. A recess or groove 32b is formed on the side of the face 32a for adhesion of the main body 32.

According to the present example, adhesive layers 43A and 43B are provided between the second main face 14d of the main body 14 and the adhesion face 32a of the supporting body 32 to adhere the main body 14 and supporting body 32. The thickness T1 of each of the adhesive layers 43A and 43B is 200 μm oe smaller. An air layer 35 is formed under the main face 14d in regions where optical waveguides 15b and 15c are formed. The air layer 35 functions as a low dielectric portion.

On the viewpoint of velocity matching, the thickness T2 of the low dielectric portion 30, 35 or 36 may preferably by 10 μm or larger, and more preferably be 30 μm or larger. On the viewpoint of preventing the concentration of stress on the optical waveguide device, the thickness T2 of the low dielectric portion 30, 35 or 36 may preferably be 0.5 μm or smaller and more preferably be 1000 μm or smaller.

The present invention may be also applied to a traveling wave type optical modulator of so-called independent modulation type.

The material of the electrode is not particularly limited, as far as it has superior impedance property and a low resistance. The material may be gold, silver copper or the like.

Specific examples of the adhesives are not particularly limited as far as the above conditions are satisfied, they include an epoxy resin type adhesive, thermal setting resin type adhesive, ultraviolet curable resin type adhesive and "Alon Ceramics C" (trade name: manufactured by Toa Gosei: thermal expansion coefficient of $13 \times 10^{-6}$ K) having a thermal expansion coefficient relatively close to that of the material having electro-optic effect such as lithium niobate.

Further, the adhesive glass may preferably be that having a low dielectric constant and a temperature suitable for adhesion (working temperature) of about 600° C. or lower. Further, it is preferred that a sufficient adhesive strength can be obtained after the processing. Specifically, so-called solder glass containing a composition of a plurality of ingredients such as silicon oxide, lead oxide, aluminum oxide, magnesium oxide, calcium oxide, boron oxide or the like.

Further, a sheet of an adhesive may be provided between the back face of the main body 14 and the supporting body to adhere them. Preferably, a sheet made of a thermal setting, light curable or light thickening resin adhesive is provided between the back face of the main body 4 and the supporting body and cured.

EXAMPLES

Example 1

A Ti diffusion waveguide and CPW electrode pattern were formed on a lithium niobate substrate of X-cut (see FIGS. 1 and 2). The gaps of the central electrode 1B and ground electrodes 1A and 1C were 25 μm, respectively, the width of the central electrode 1B was 30 μm, the thickness of each of the electrodes was 28 μm, and the length of each electrode was 32 mm. The distance "L" of the arms of the optical waveguide was 55 μm. The substrate was then subjected to polishing and thinning to produce a thin type optical modulator having a low dielectric layer and a supporting body (lithium niobate plate of X-cut). The thickness of the substrate 5 for optical modulator was 8.5 μm, and the low dielectric layer 6 has a dielectric constant of 3.8 and a thickness of 50 μm. The end face of the connecting part of an optical fiber was then subjected to polishing and the substrate was cut by dicing to produce chips. The modulator chips were subjected to optical axis alignment with the optical fiber and adhered and fixed with a UV curable resin. The height "H" and width "W" of the ridge 6 of the optical waveguide 2 measured after the production of the device was changed as shown in table 1. Further, table 1 shows the values of the products H×W. The thus obtained devices were subjected to the observation of modes. The results were shown in table 1.

TABLE 1

| Width W of Optical waveguide | Height "H" of swell of optical waveguide (Å) | | | |
|---|---|---|---|---|
| μm | 750 | 850 | 1100 | 1150 |
| 3 | 2.2 Single 2250 | 1.8 Single 2550 | 1.4 Single 3300 | 1.4 Single 3450 |
| 4 | 1.85 Single 3000 | 1.3 Single 3400 | 1.22 Single 4400 | 1.3 Single 4600 |
| 5 | 1.65 Single 3750 | 1.1 Single 4250 | 1.09 Single 5500 | 1 Single 5750 |
| 6 | 1.5 Single 4500 | 1.05 Single 5100 | 1 Single 6600 | 0.9 Single 6900 |
| 6.5 | 1.45 Single 4875 | 1.02 Single 5525 | 0.98 single 7150 | 0.9 Multi 7475 |
| 7 | 1.35 Single 5250 | 1 Single 5950 | 0.95 Multi 7700 | 0.9 Multi 8050 |
| 8 | 1.3 Single 6000 | 0.95 Single 6800 | 0.95 Multi 8800 | 0.85 Multi 9200 |
| 9 | 1.2 single 6750 | 0.95 Multi 7650 | 0.9 Multi 9900 | 0.85 Multi 10350 |

Notes:
upper column: Mode size of an optical waveguide in horizontal direction, provided that 1 is assigned to the mode size of a 1.55 μm band Panda fiber in horizontal direction (direction of slow axis)
Lower column: W × H μm · angstrom Further, the height "H" and width "W" of the swell of an optical waveguide were changed as shown in FIG. 2 and as described above, when the thickness of a substrate of an electro-optic material was as thick as 1 mm. The mode was observed and the results were shown in Table 2.

TABLE 2

| Width of Optical Waveguide (μm) | Height of Swell of optical waveguide (Å) | Mode size ※ 1 | Mode | Width of optical waveguide × height of Swell of optical waveguide (μm × Å) |
|---|---|---|---|---|
| 3 | 1150 | 1.4 | Single | 3450 |
| 4 | 1150 | 1.2 | Single | 4600 |
| 5 | 1150 | 1 | Single | 5750 |
| 6 | 1150 | 0.9 | Single | 6900 |
| 7 | 1150 | 0.85 | Single | 8050 |
| 9 | 1150 | 0.85 | Multi | 10350 |

※ 1: Mode size of an optical waveguide in horizontal direction, provided that 1 is assigned to the mode size of a 1.55 μm band Panda fiber in horizontal direction (direction of slow axis)

According to the comparison of tables 1 and 2, multi mode propagation was observed in a wide range as shown in table 1, even under the condition of dimensions of single mode when the thickness of the substrate of electro-optic crystal was large (table 2).

Further, when the thickness of the substrate is 1 mm, the optical waveguide was made cut-off to prevent the propagation of light therein when the width of the optical waveguide is 6 μm or smaller, under the condition that the height "H" of the swell of the optical waveguide is 1000 angstrom. It has been, however, proved that light can be propagated in single mode at a width of optical waveguide of 6 μm or smaller, for example even 3 μm or smaller, by lowering the thickness of the substrate to 30 μm or smaller. It is thus possible to prevent the deviation of operational point of applied voltage and extinction ratio depending on wavelength, by satisfying the condition that light can be propagated in single mode as described above.

It was proved to be necessary to adjust H×W at a value of 7150 angstrom·μm or lower for realizing single mode, in a thin type modulator having a substrate of electro-optic material with a thickness of 30 μm or smaller.

Example 2

In the Example 1, the distance "L" between optical waveguide arms was 55 μm, the height "H" of the ridge 6 of the optical waveguide 2 was 860 angstrom, the width "W" was 6 μm and the product of both was made 5160 angstrom·μm.

S21 of the device was measured to prove that no ripple was found in a wavelength range of 50 GHz or lower, the curve of the graph was smooth and was lowered by minus 6 dB only in a range of 30 GHz or higher. Further, S11 was minus 10 dB or larger in a measured range of up to 50 GHz. Further, the mode was observed as an optical property. The observed mode proved to be single mode, the extinction ratio was 20 dB or more in a range of 1530 nm to 1610 nm, and the dependency of extinction ratio curve on voltage was proved to be small and ±5 percent or smaller.

Figure 12:
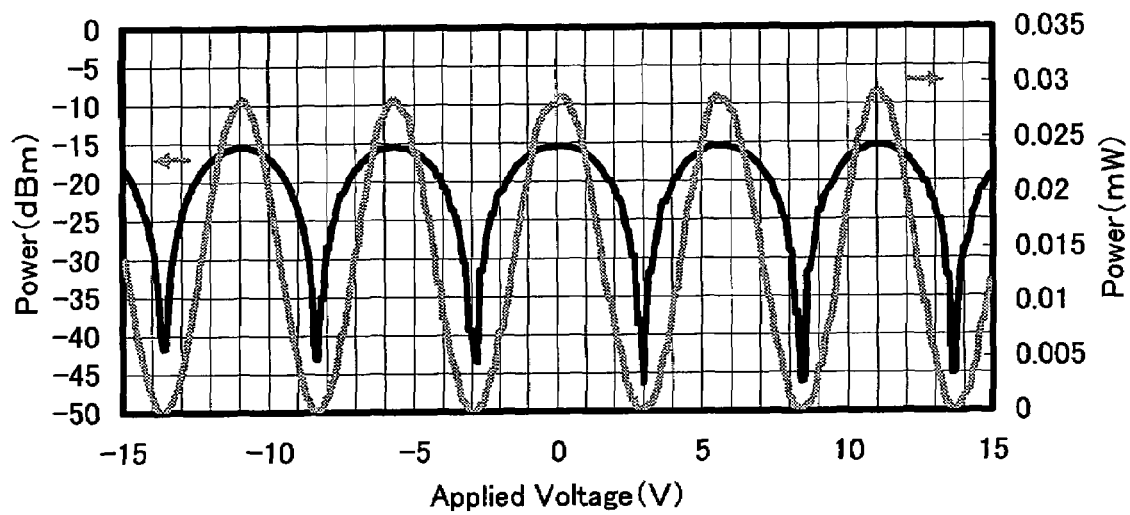
FIG. 12 is a graph showing the dependency of the extinction ratio on applied voltage according to a device of an example of the present invention.

FIG. 12 shows the relationship of the extinction ratio and applied voltage according to the present example. The heights of the peaks are substantially constant, and the positions of the peaks and bottoms are substantially constant.

Figure 14:
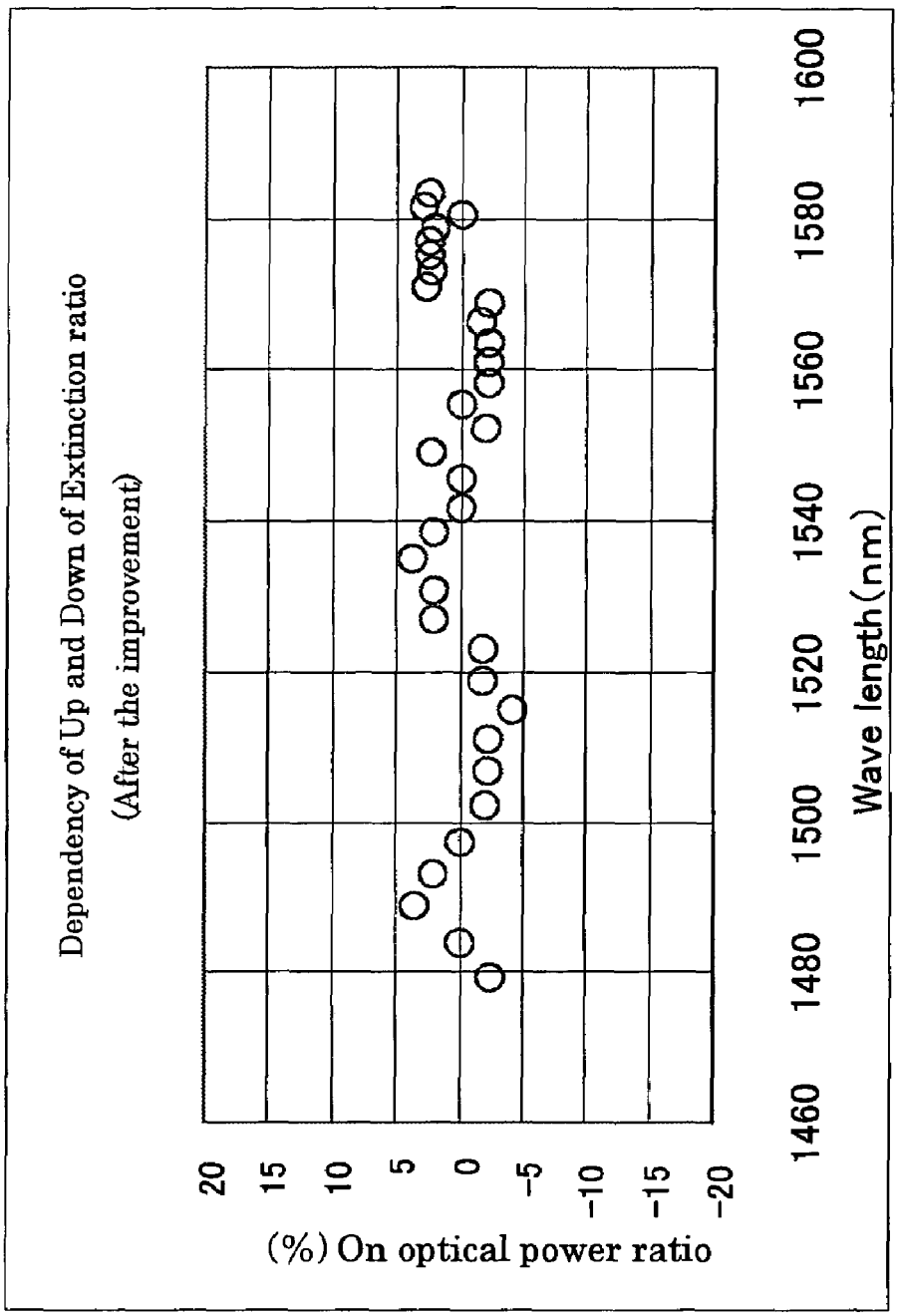
FIG. 14 is a graph showing the dependency of the extinction ratio on applied voltage according to a device of an example of the present invention.
Figure 15:
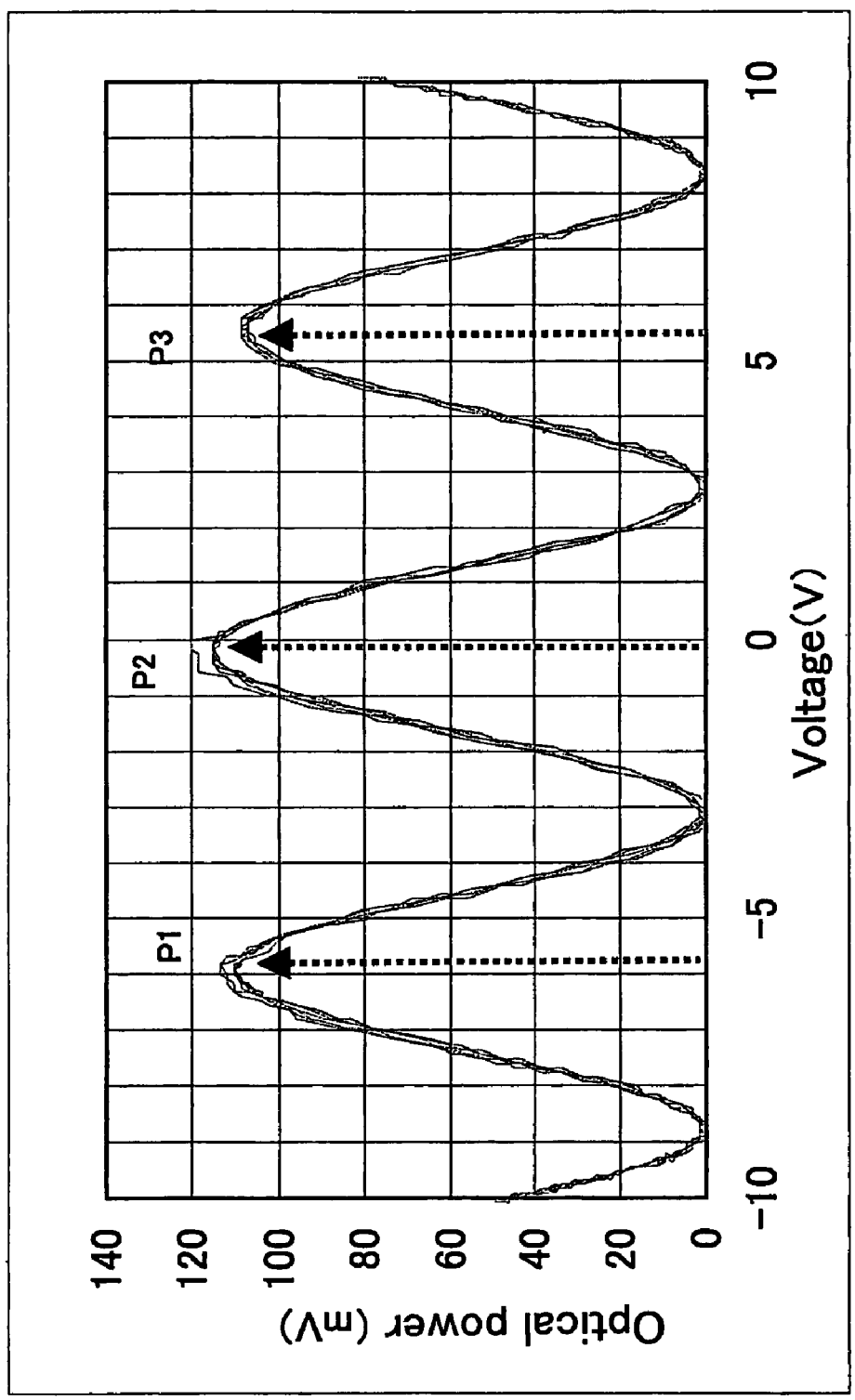
FIG. 15 is a graph for explaining a method of calculating P value.

Further, the dependency of extinction ratio on wavelength was shown in FIG. 14. The term "optical strength of ON light" (ΔP) is measured as follows. That is, in FIG. 15, each height of each of adjacent peaks P1, P2 and P3 was measured. The strength was calculated as the ratio of P1 or P3, for example (P1-P2)×100/P2 (%), provided that the applied voltage for P2 is closer to zero. As a result, as shown in FIG. 14, the dependency of the ON optical strength on wavelength was proved to be as small as ±5%.

Example 3

In the Example 1, the gap between the central electrode 1B and ground electrode 1A or 1C was made 40 μm, the width of the central electrode 1B was 30 μm, the thickness of each electrode was 28 μm, and the length of the electrode was 40 μm. The distance "L" between optical waveguide arms was made 70 μm, the height "H" of the ridge 6 of the optical waveguide 2 was 860 angstrom, the width "W" was 6 μm and the product of both was made 5160 angstrom·μm.

S21 of the device was measured to prove that no ripple was found in a wavelength range of 50 GHz or lower, the curve of the graph was smooth and was lowered by minus 6 dB only in a range of 25 GHz or higher. Further, S11 was minus 10 dB or smaller in a measured range of up to 50 GHz. Further, the mode was observed as an optical property. The observed mode proved to be single mode, the extinction ratio was 20 dB or more in a range of 1530 nm to 1610 nm, and the dependency of extinction ratio curve on voltage was proved to be small and ±5 percent or smaller.

Example 4

A thin type modulator was produced according to the same procedure as the Example 2. The distance between optical waveguide arms was 55 µm, the width "W" was 6 µm, the height "H" of the ridge 6 of the optical waveguide 2 was 1150 angstrom, and the product of both was made 6900 angstrom·µm. S21 of the device was measured to prove that no ripple was found in a wavelength range of 50 GHz or lower, the curve of the graph was smooth and was lowered by minus 6 dB only in a range of 30 GHZ or higher. Further, S11 was minus 10 dB or smaller in a measured range of up to 50 GHz. Further, the mode was observed as an optical property. The observed mode proved to be single mode, the extinction ratio was 20 dB or more in a range of 1530 nm to 1610 nm, and the dependency of extinction ratio curve on voltage was proved to be small and ±5 percent or smaller.

Example 5

A thin type modulator was produced according to the same procedure as the Example 2. The width of the central electrode was made 20 µm and the distance between optical waveguide arms was made as small as 45 µm. The width "W" was 6 µm, the height "H" of the ridge 6 of the optical waveguide 2 was 860 angstrom and the product of both was made 6900 angstrom·µm. S21 of the device was measured to prove that no ripple was found in a wavelength range of 50 GHz or lower, the curve of the graph was smooth and was lowered by minus 6 dB only in a range of 30 GHz or higher. Further, S11 was minus 10 dB or lower in a measured range of up to 50 GHz. Further, the mode was observed as an optical property. The observed mode proved to be single mode, the extinction ratio was lower than 20 dB in a part of a range of 1530 nm to 1610 nm, and the dependency of extinction ratio curve on voltage was proved to be small and ±5 percent or smaller.

Example 6

A thin type modulator was produced according to the same procedure as the Example 2. The width of the central electrode was made 20 µm and the distance between optical waveguide arms was as small as 45 µm, as the Example 5. The width "W" was 6 µm, the height "H" of the ridge 6 of the optical waveguide 2 was 860 angstrom and the product of both was made 6900 angstrom·µm. Then as shown in FIG. 3, it was formed a groove 5c having a width of 20 µm and a depth of 3 µm from the back face 5b of the substrate 5 for modulation over the whole length of a region right under the central electrode 1B. The groove was formed by means of excimer laser processing. S21 of the device was measured to prove that no ripple was found in a wavelength range of 50 GHz or lower, the curve of the graph was smooth and was lowered by minus 6 dB only in a range of 30 GHz or higher. Further, S11 was minus 10 dB in a measured range of up to 50 GHz. Further, the mode was observed as an optical property. The observed mode proved to be single mode, the extinction ratio was 20 dB or more in a range of 1530 nm to 1610 nm, and the dependency of extinction ratio curve on voltage was proved to be small and ±5 percent or smaller.

Comparative Example 1

A thin type modulator was produced according to the same procedure as the Example 2. The distance between optical waveguide arms was 55 µm. The width "W" of the ridge 6 of the optical waveguide 2 was 6.5 µm, the height "H" was 1150 angstrom, and the product of both was made 7475 angstrom~µm. S21 of the device was measured to prove that no ripple was found in a wavelength range of 50 GHz or lower, the curve of the graph was smooth and was lowered by minus 6 dB only in a range of 30 GHz or higher. Further, S11 was minus 10 dB in a measured range of up to 50 GHz.

Further, the mode was observed as an optical property. The observed mode proved to be multi mode. The extinction ratio was lower than 20 dB in a part of a range of 1530 nm to 1610 nm, and the dependency of extinction ratio curve on voltage was proved to be larger than ±5 percent.

Figure 11:
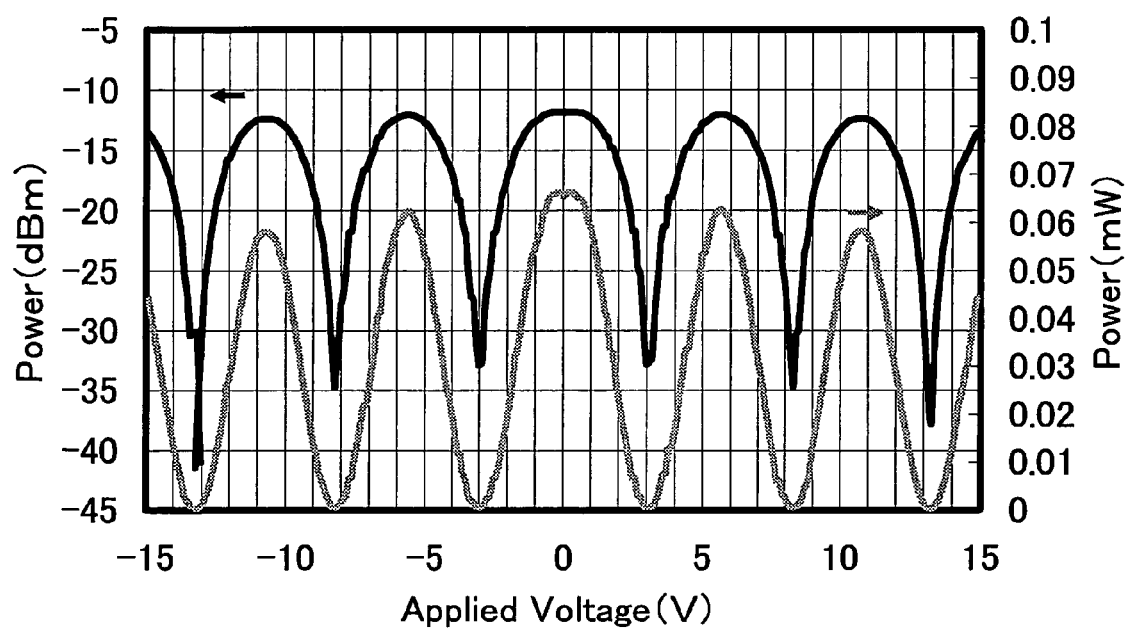
FIG. 11 is a graph showing the dependency of the extinction ratio on applied voltage according to a device of a comparative example.

FIG. 11 shows the relationship of the extinction ratio and applied voltage according to the present example. The heights of the peaks are deviated, and the positions of the peaks and bottoms are not constant.

Figure 13:
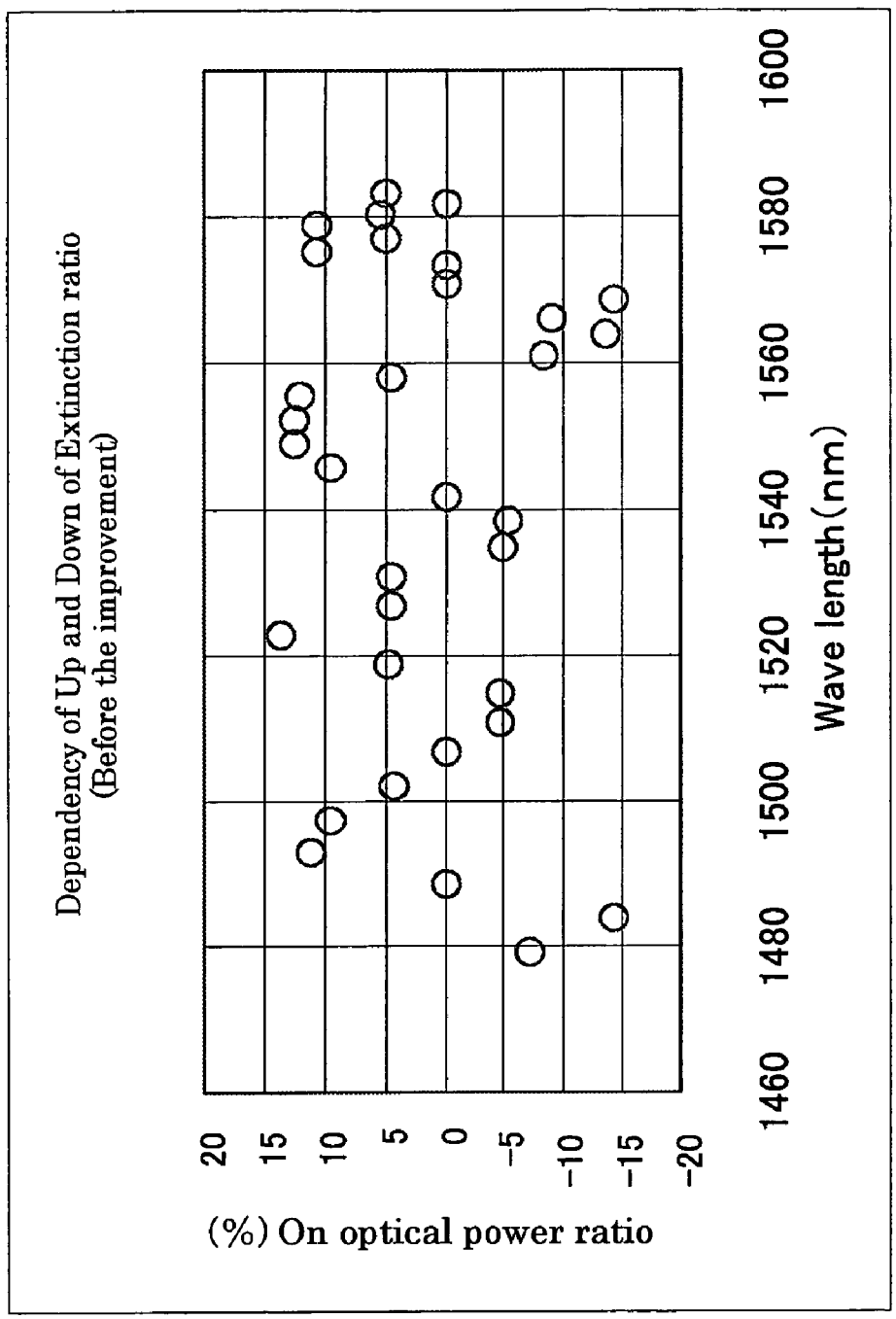
FIG. 13 is a graph showing the dependency of the extinction ratio on applied voltage according to a device of a comparative example.

Further, the dependency of extinction ratio on wavelength was shown in FIG. 13. As a result, the dependency of the ON optical strength on wavelength was proved to be as large as ±15%.

Example 7

Figure 16:
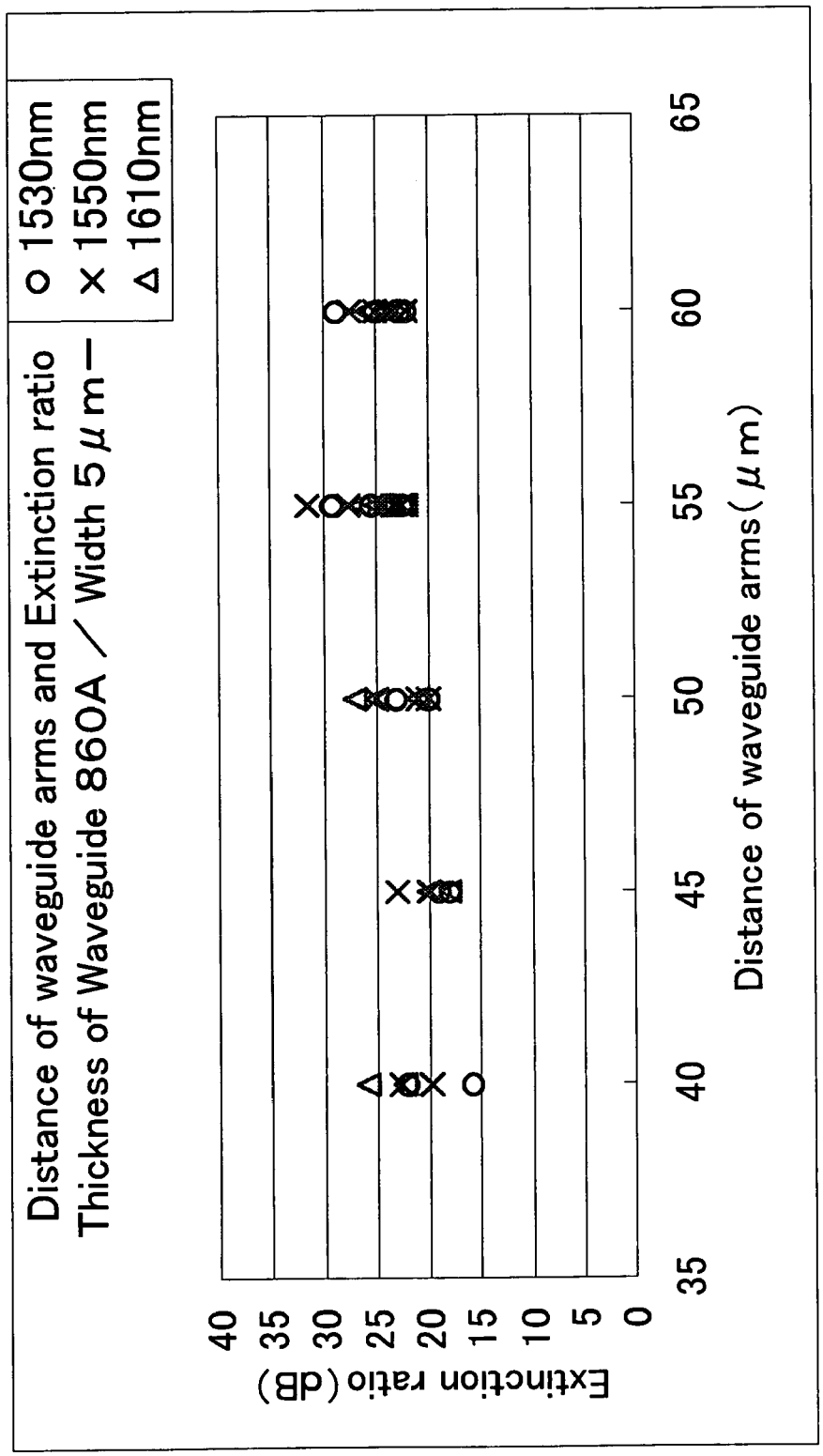
FIG. 16 is a graph showing the relationship of a distance (L) of waveguide arms and extinction ratio.
Figure 17:
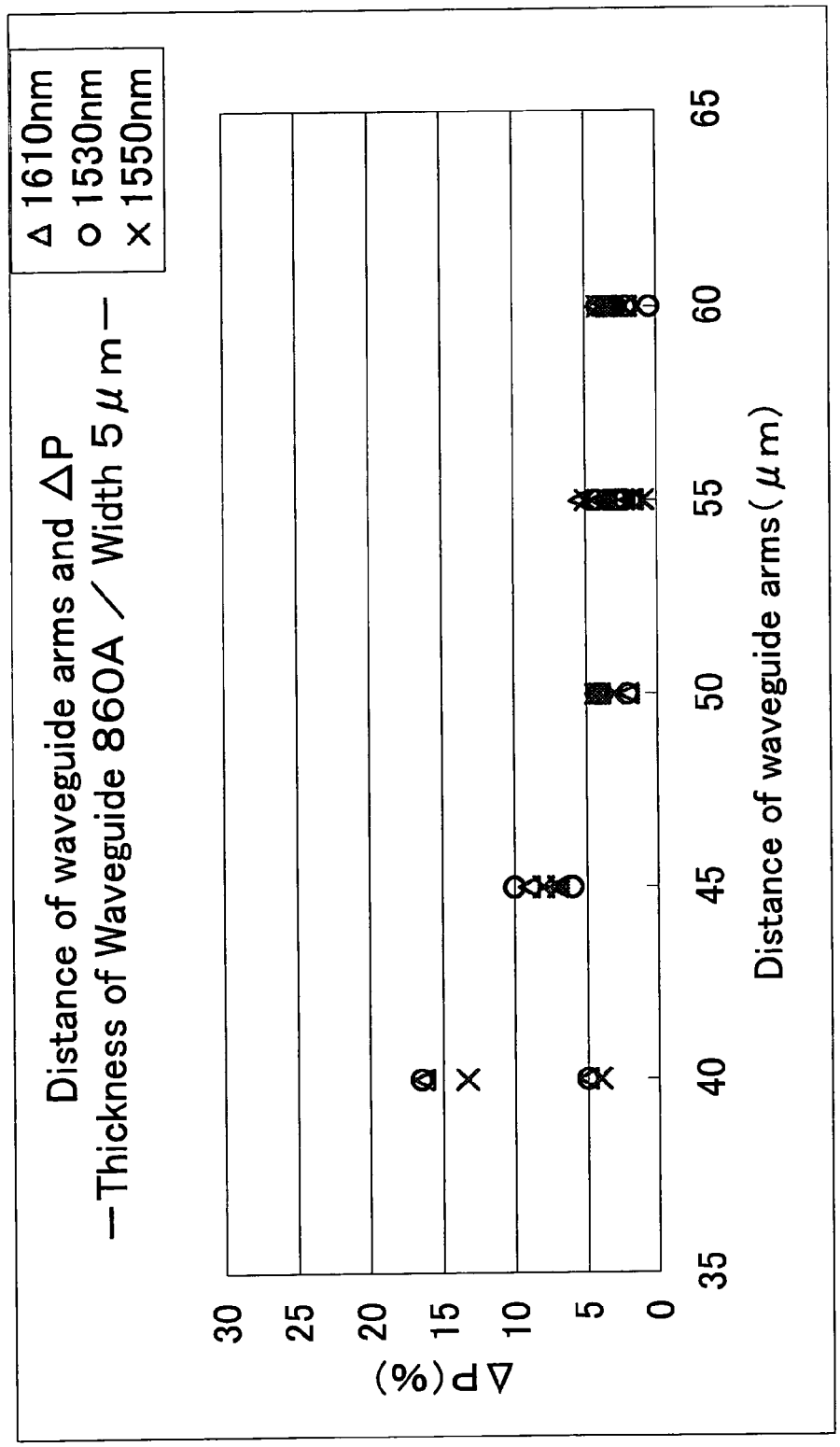
FIG. 17 is a graph showing the relationship of a distance (L) of waveguide arms and extinction ratio.

A device was produced according to the same procedure as the Example 2. The height of the recess was 860 angstrom, the width was 5 µm and the product of both was made 4300 angstrom·µm. The distance of the optical waveguide arms (distance "L" of the branched parts 2b and 2c) was changed as shown in FIGS. 16 and 17. The dependency of the extinction ratio with respect to "L" was shown in FIG. 16, and the dependency of ΔP with respect to "L" was shown in FIG. 17. As shown in the results, the extinction ratio can be made 20 dB or more over a wide range of wavelength and ΔP can be controlled within ±5% by increasing the distance "L" of arms to 46 µm or more. On the viewpoint, "L" may more preferably be 50 µm or more.

Example 8

Figure 18:
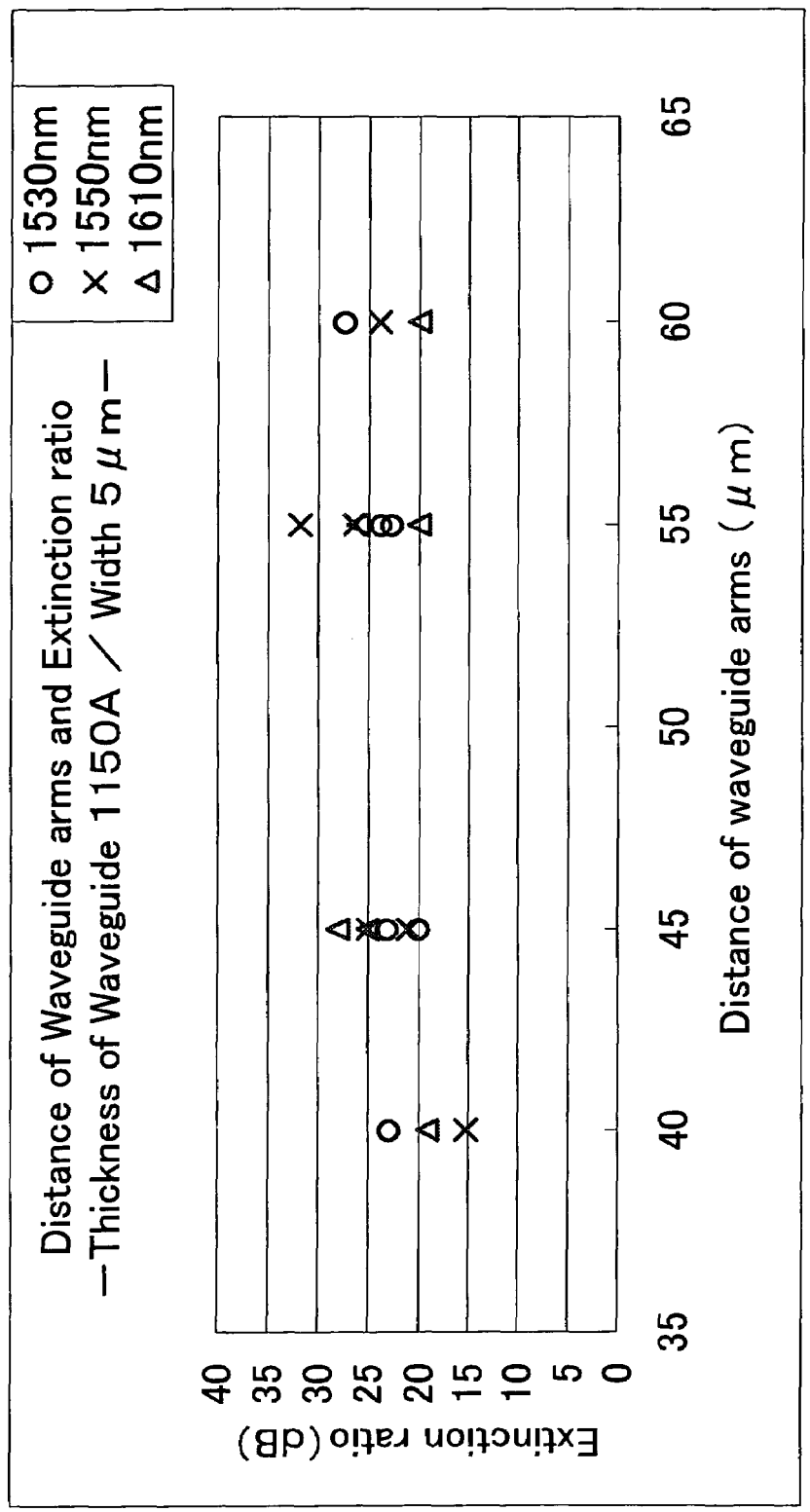
FIG. 18 is a graph showing the relationship of a distance (L) of waveguide arms and extinction ratio.
Figure 19:
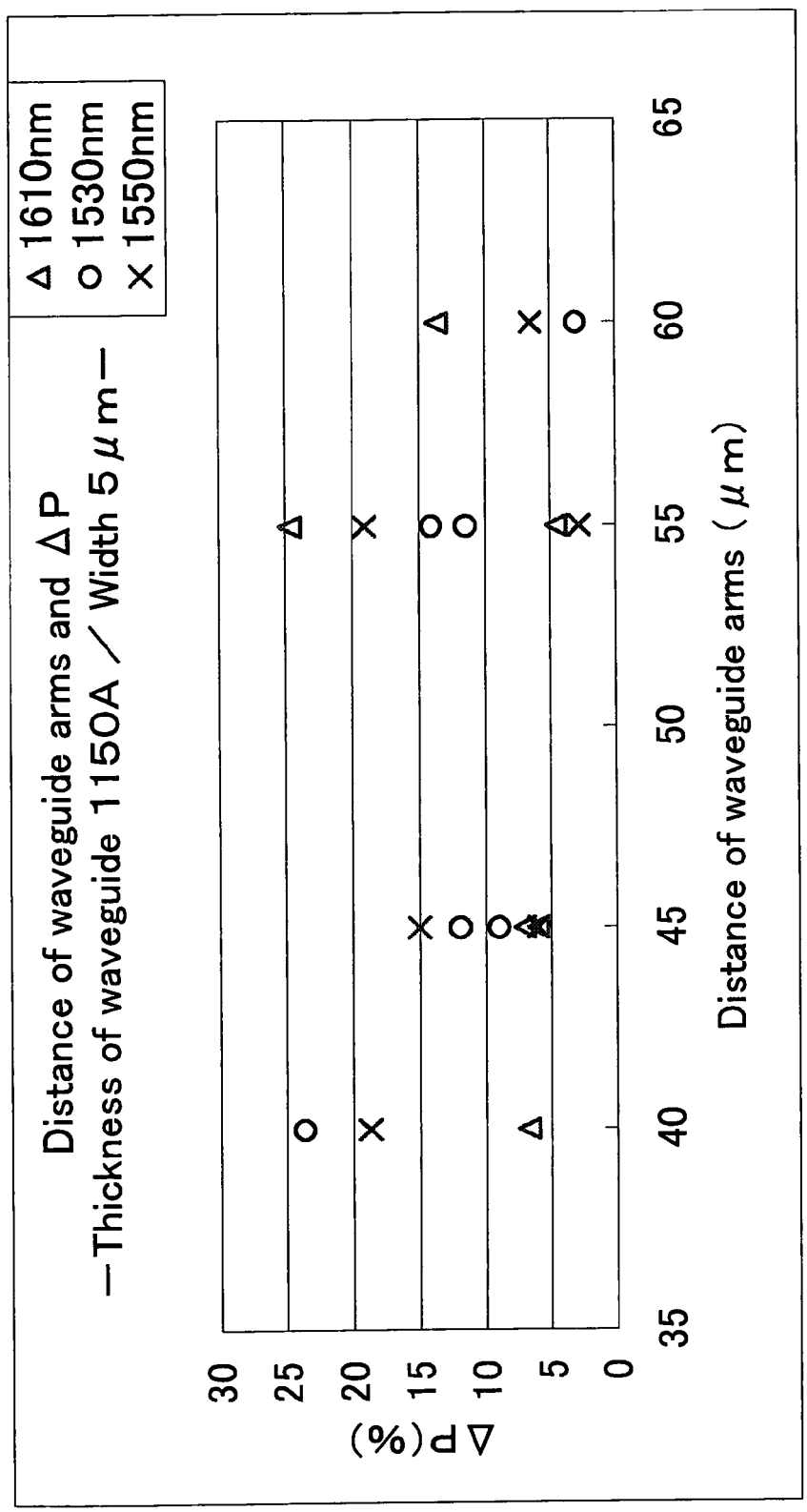
FIG. 19 is a graph showing the relationship of a distance (L) of waveguide arms and ΔP.

A device was produced according to the same procedure as the Example 2. The height of the recess was 1150 angstrom, the width was 5 µm and the product of both was made 5750 angstrom·µm. The distance of the optical waveguide arms (distance "L" of the branched parts 2b and 2c) was changed as shown in FIGS. 18 and 19. The dependency of the extinction ratio with respect to "L" was shown in FIG. 18, and the dependency of ΔP with respect to "L" was shown in FIG. 19. As shown in the results, the extinction ratio can be made 20 dB or more over a wide range of wavelength by increasing the distance "L" of arms to 46 µm or more. Further, according to the present example, ΔP cannot be made within ±5%.

Example 9

Device 11 of FIG. 6

An optical modulator 11 of FIG. 6 was produced. Specifically, a substrate made of 3 inch wafer ($LiNbO_3$ single crystal) of X-cut was used. Mach-Zehnder type optical waveguides 15b, 15c are formed on the surface of the wafer by titanium diffusion and photolithography. The size of the optical waveguide can be made 10 µm at $1/e^2$, for example. A CPW electrode pattern is then formed by plating process. The gaps between the central electrode 17B and ground electrodes 17A, 17C are made 40 µm, respectively, the thickness of the electrode is made 28 µm and the length of the electrode is made 40 mm. A dummy wafer for polishing is adhered with a thermoplastic resin onto a surface plate for polishing, and the modulator substrate is adhered onto the dummy wafer by a thermoplastic resin with the electrode side downwardly. Further, the main body 14 is processed to a thickness of 10 µm by lateral grinding and polishing (CMP). Thereafter, a flat plate-shaped supporting body 12 is adhered and fixed to the main body 14, the end face of the connecting part for an optical fiber is polished, and cut by dicing to chips. The resin for adhesion and fixing was an epoxy resin film having a resin thickness of 50 μm. The width of the chip was 4.4 mm and the total thickness of the chip and reinforcing supporting body was made 1 mm. A single core fiber array holding 1.55 μm band Panda fibers is connected to the input side and a single core fiber array holding single mode optical fibers is connected to the output side of the traveling wave type optical modulator. The optical fibers and optical waveguide is optically aligned and the fiber arrays and modulator are adhered with a thermosetting resin adhesive.

According to the present example, the substrate of X-cut 3 inch wafer (LiNbO$_3$ single crystal) was used. The thermal expansion coefficients in the X-axis and Y-axis are 16×10$^{-6}$/° C., respectively, and the thermal expansion coefficients in the Z-axis is 5×10$^{-6}$/° C. The material of the supporting body 2 was x-cut lithium niobate single crystal.

Figure 20:
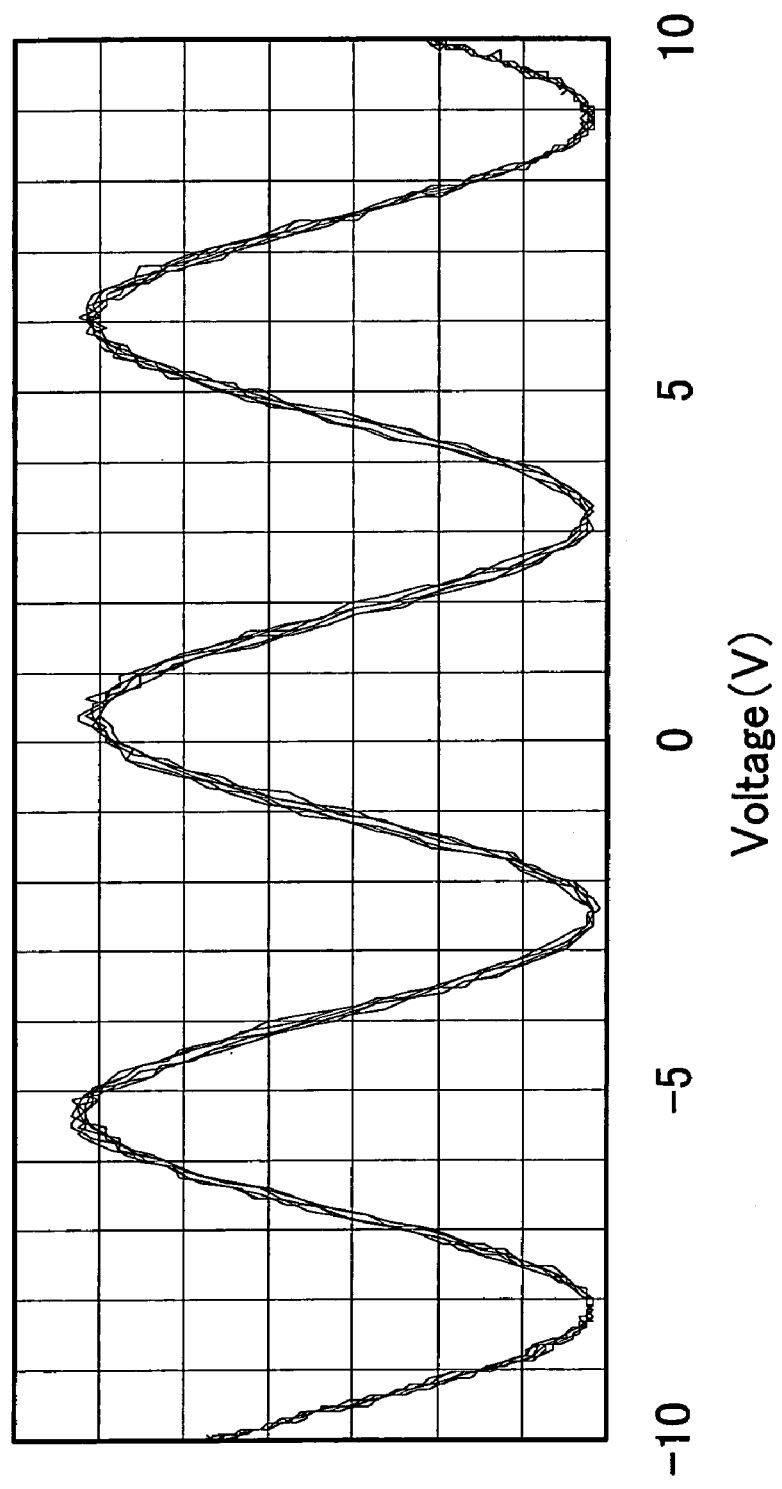
FIG. 20 is a graph showing the relationship of optical power and voltage according to a device of the inventive example.
Figure 21:
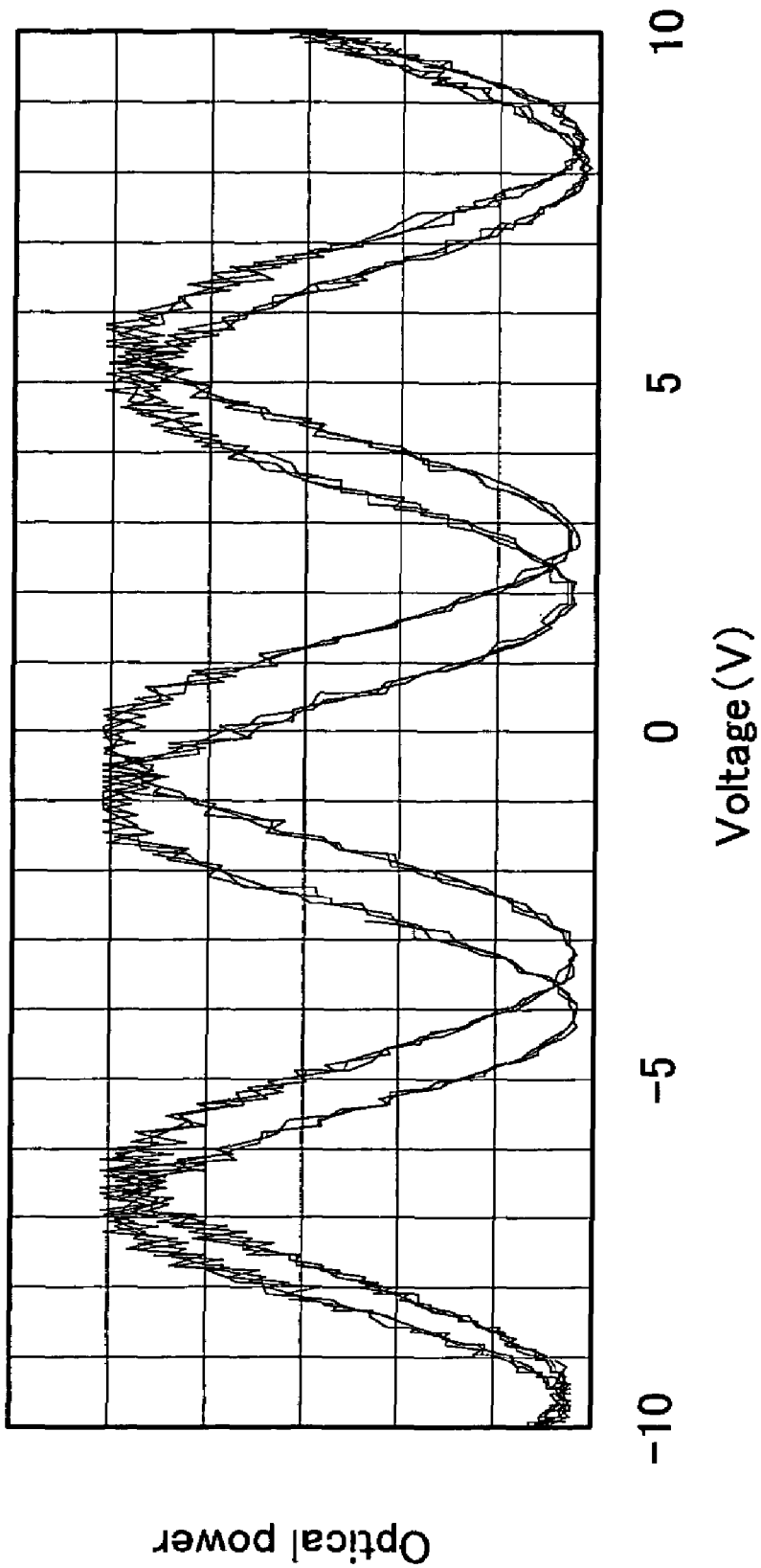
FIG. 21 is a graph showing the relationship of optical power and voltage in a device of a comparative example.

The extinction curve with respect to a signal of 1 KHz is shown in FIG. 20. As can be seen from the results, no hysterisis was observed in the optical power. Further, the DC drift was evaluated at 100° C. to prove that the shit amount of the DC bias was within a deviation of 50 percent with respect to the initial applied voltage.

Example 10

Device 11C of FIG. 9

The device 11C of FIG. 9 was produced. Specifically, an optical waveguide 29 was produced according to the same procedure as the Example 9. The thickness "t" of the main body 14 was made 12 μm. An air layer 31 was provided as shown in FIG. 9. According to the present example, the main body of X-cut LiNbO$_3$ single crystal was used. The material of the supporting body 12 was x-cut lithium niobate single crystal.

Hysterisis was not observed in the extinction curve with respect to a signal of 1 KHz. Further, the DC drift was evaluated at 100° C. to prove that the shit amount of the DC bias was within a deviation of 50 percent with respect to the initial applied voltage.

Example 11

Device 11A of FIG. 7

The device 11A of FIG. 7 was produced. Specifically, an optical waveguide substrate 29 was produced according to the same procedure as the Example 9. Thereafter, a supporting body 32 with a groove 32b having a width of 0.3 mm and a depth of 0.2 mm formed was adhered to the optical waveguide substrate 29. the end face of the connecting part for an optical fiber was polished and cut by dicing to chips. Adhesive resin 36 was filled in the groove 32b of the supporting body 32. T1 was thus 50 μm and T2 was 250 μm. According to the present example, a main body of X-cut single crystal of LiNbO3 was used. The material of the supporting body 12 was X-cut lithium niobate single crystal.

Hysterisis was not observed in the extinction curve with respect to a signal of 1 KHz. Further, the DC drift was evaluated at 100° C. to prove that the shit amount of the DC bias was within a deviation of 50 percent with respect to the initial applied voltage.

Example 12

Device 11D of FIG. 10

The device 11D of FIG. 10 was produced. Specifically, an optical waveguide 29 was produced according to the same procedure as the Example 1. The thickness of the main body 14 was made 12 μm. Thereafter, a supporting body 32 with a groove 32b having a width of 0.3 mm and a depth of 0.2 mm formed was adhered to the optical waveguide substrate 29. The end face of the connecting part for an optical fiber was polished and cut by dicing to chips. An air layer 35 was formed in the groove 32b of the supporting body 32. T1 was thus 50 μm and T2 was 250 μm. According to the present example, a main body of X-cut single crystal of LiNbO3 was used. The material of the supporting body 12 was X-cut lithium niobate single crystal.

Hysterisis was not observed in the extinction curve with respect to a signal of 1 KHz. Further, the DC drift was evaluated at 100° C. to prove that the shit amount of the DC bias was within a deviation of 50 percent with respect to the initial applied voltage.

Example 13

Device 11 of FIG. 6

In the same structure as that shown in FIG. 6, the material of the supporting body 12 was changed to lithium tantalate. According to the present example, a substrate made of 3 inch wafer of x-cut (LiNbO$_3$ single crystal). The thermal expansion coefficients in the X-axis and Y-axis are 16×10$^{-6}$/° C., respectively, and the thermal expansion coefficient in the Z-axis is 5×10$^{-6}$/° C. The material of the supporting body 2 was X-cut lithium tantalate single crystal whose thermal expansion coefficients in the X-axis and Y-axis are 16×10$^{-6}$/° C., respectively, and the thermal expansion coefficient in the Z-axis is 1.2×10$^{-6}$/° C.

No hysterisis was found in the extinction curve with respect to a signal of 1 kHz. Further, the DC drift was evaluated at 100° C. to prove that the shit amount of the DC bias was within a deviation of 50 percent with respect to the initial applied voltage.

Comparative Example 2

Device 11 of FIG. 6

According to the present example, a substrate made of 3 inch wafer of x-cut (LiNbO$_3$ single crystal) was used. The thermal expansion coefficients in the X-axis and Y-axis are 16×10$^{-6}$/° C., respectively, and the thermal expansion coefficient in the Z-axis is 5×10$^{-6}$/° C. The material of the supporting body 2 was quartz glass whose thermal expansion coefficient is 50×10$^{-6}$/° C.

No hysterisis was found in the extinction curve with respect to a signal of 1 kHz. Further, the DC drift was evaluated at 100° C. to prove that the shit amount of the DC bias was out of a deviation of 50 percent with respect to the initial applied voltage.

According to the second aspect of the invention, it is possible to prevent hysterisis phenomenon in optical power upon the application of a signal voltage and long-term DC drift in an optical waveguide device.

The invention claimed is:
1. An optical waveguide device comprising a substrate of an electro-optic crystal, an optical waveguide and a modula- tion electrode, wherein said substrate of an electro-optic material has a thickness of 30 μm or smaller at least in a region where said modulation electrode applies an electric field, and wherein said device comprises a swell generated during the formation of said optical waveguide, said swell having a height H (angstrom) and a width "W" (μm) whose product (H×W) is 7150 angstrom·μm or smaller.

2. The optical waveguide device of claim 1, wherein said swell has a height H of 1100 angstrom or lower and a width W of 6.5 μm or smaller.

3. An optical waveguide device comprising a substrate of an electro-optic crystal, an optical waveguide and a modulation electrode, wherein said substrate of an electro-optic material has a thickness of 30 μm or smaller at least in a region where said modulation electrode applies an electric field, wherein said optical waveguide comprises an outlet part and wherein the optical field pattern of an optical waveguide at least in the horizontal direction is single mode at least in said outlet part.

4. The optical waveguide substrate of claim 1, wherein said optical waveguide comprises branched parts in said region where said electric field is applied, and wherein said branched parts are distant from each other by 46 μm or larger.

5. The optical waveguide device of claim 1, wherein said optical waveguide comprises branched parts in said region where said electric field is applied, and wherein a groove is formed in said substrate of an electro-optic material between said branched parts.

6. An optical waveguide device comprising a substrate of an electro-optic crystal, an optical waveguide and a modulation electrode, wherein said optical waveguide is formed on an upper surface of said substrate of said electro-optical crystal and comprises branched parts in a region where said modulation electrode applies an electric field, and wherein a groove is formed on a lower surface of said substrate of said electro-optic crystal between said branched parts.

7. The optical waveguide device of claim 1, comprising a supporting body for supporting said substrate of an electro-optic material and an adhesive layer for adhering said substrate of an electro-optic material and said supporting body, wherein the minimum value of the thermal expansion coefficient of said supporting body is ⅕ or larger of the minimum value of the thermal expansion coefficient of said substrate, and wherein the maximum value of the thermal expansion coefficient of said supporting body is 5 times or smaller of the maximum value of the thermal expansion coefficient of said substrate.

8. The optical waveguide device of claim 7, wherein said supporting body comprises one or more material(s) selected from the group consisting of lithium niobate, lithium tantalate, a solid solution of lithium niobate-lithium tantalate and potassium lithium niobate.

9. The optical waveguide device of claim 8, wherein said supporting body comprises lithium niobate single crystal.

10. An optical waveguide device comprising an optical waveguide substrate, a supporting body for supporting said optical waveguide substrate and an adhesive layer for adhering said optical waveguide substrate and said supporting body,
said optical waveguide substrate comprising a plate-shaped main body comprising an electro-optic material, first and second main faces opposing each other and a thickness of 30 μm or smaller, an optical waveguide provided on said main body and an electrode provided on said main body,
wherein said adhesive layer adheres said supporting body and said second main face of said main body, wherein the minimum value of the thermal expansion coefficient of said supporting body is ⅕ or larger of the minimum value of the thermal expansion coefficient of said main body, and wherein the maximum value of the thermal expansion coefficient of said supporting body is 5 times or smaller of the maximum value of the thermal expansion coefficient of said main body.

11. The optical waveguide device of claim 10, wherein said supporting body comprises a substantially flat face for adhesion, and wherein said adhesive layer has a dielectric constant lower than that of said electro-optic material.

12. The optical waveguide device of claim 10, wherein said adhesive layer has a thickness of 200 μm or smaller.

13. The optical waveguide device of claim 10, wherein said adhesive layer adheres said second main face of said main body and said supporting body in a region where said optical waveguide is formed.

14. The optical waveguide device of claim 10, wherein said adhesive layer has a substantially constant thickness.

15. The optical waveguide device of claim 10, further comprising a low dielectric part having a dielectric constant lower than that of said electro-optic material between said second main face of said main body and said supporting body in a region where said optical waveguide is formed.

16. The optical waveguide device of claim 10, wherein said supporting body comprises an electro-optic material.

17. The optical waveguide device of claim 16, wherein said supporting body comprises one or more material(s) selected from the group consisting of lithium niobate, lithium tantalate, a solid solution of lithium niobate-lithium tantalate and potassium lithium niobate.

18. A traveling wave type optical modulator, comprising the optical waveguide device according to claim 10, wherein said electrode applies a voltage for modulating light propagating is said optical waveguide.

* * * * *